(12) United States Patent
Kashiki

(10) Patent No.: US 6,781,769 B2
(45) Date of Patent: Aug. 24, 2004

(54) SMALL-SIZED THREE-UNIT ZOOM LENS

(75) Inventor: Yasutaka Kashiki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/401,587

(22) Filed: Mar. 31, 2003

(65) Prior Publication Data
US 2003/0189764 A1 Oct. 9, 2003

(30) Foreign Application Priority Data

Apr. 9, 2002 (JP) .................................... 2002-106915

(51) Int. Cl.⁷ .............................................. G02B 15/16
(52) U.S. Cl. ...................................... 359/689; 359/685
(58) Field of Search ................................. 359/689, 685

(56) References Cited

U.S. PATENT DOCUMENTS 5,850,312 A    12/1998  Kato et al. ................... 359/689
6,327,100 B1 * 12/2001  Yamanashi .................. 359/689

FOREIGN PATENT DOCUMENTS

JP    02-051116    2/1990
JP    05-088085    4/1993

* cited by examiner

Primary Examiner—Scott J. Sugarman
Assistant Examiner—Deborah A. Raizen
(74) Attorney, Agent, or Firm—Kenyon & Kenyon

(57) ABSTRACT

A three-unit zoom lens includes, in order from the object side, the first lens unit with positive refracting power, the second lens unit with positive refracting power, and the third lens unit with negative refracting power. When the magnification of the zoom lens is changed, extending from the wide-angle position to the telephoto position, individual lens units of the three-unit zoom lens are moved toward the object side so that a space between the first lens unit and the second lens unit, after being increased as the lens units are moved from the wide-angle position toward the proximity of the middle position, is decreased as they are moved toward the telephoto position, and a space between the second lens unit and the third lens unit is also decreased accordingly. In this case, the three-unit zoom lens has a variable magnification ratio of 2 or higher and the first lens unit is constructed with a single lens element.

15 Claims, 26 Drawing Sheets

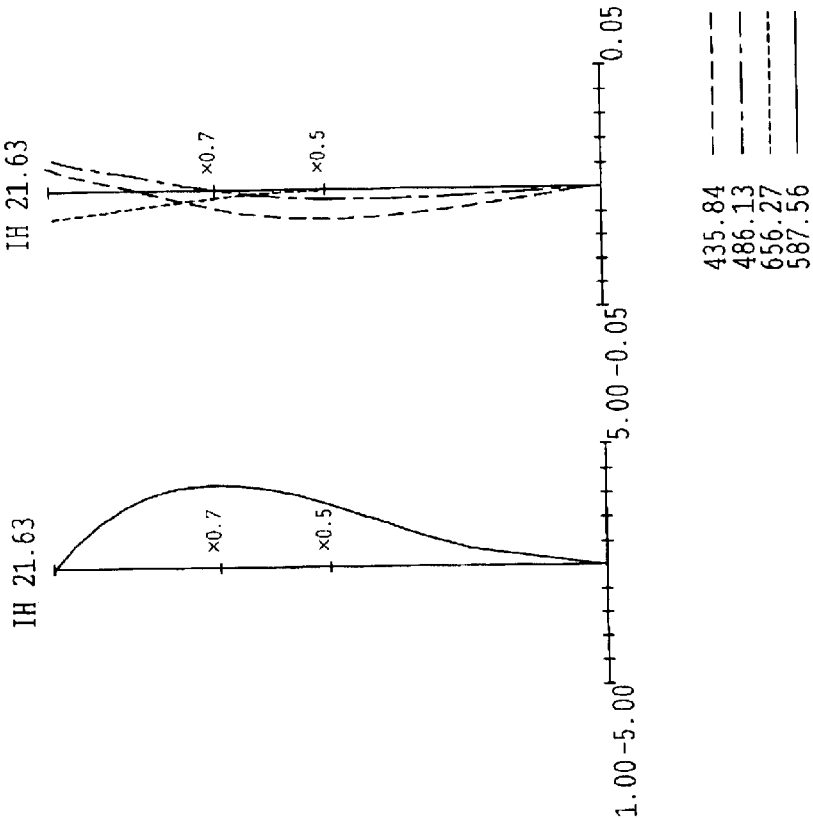

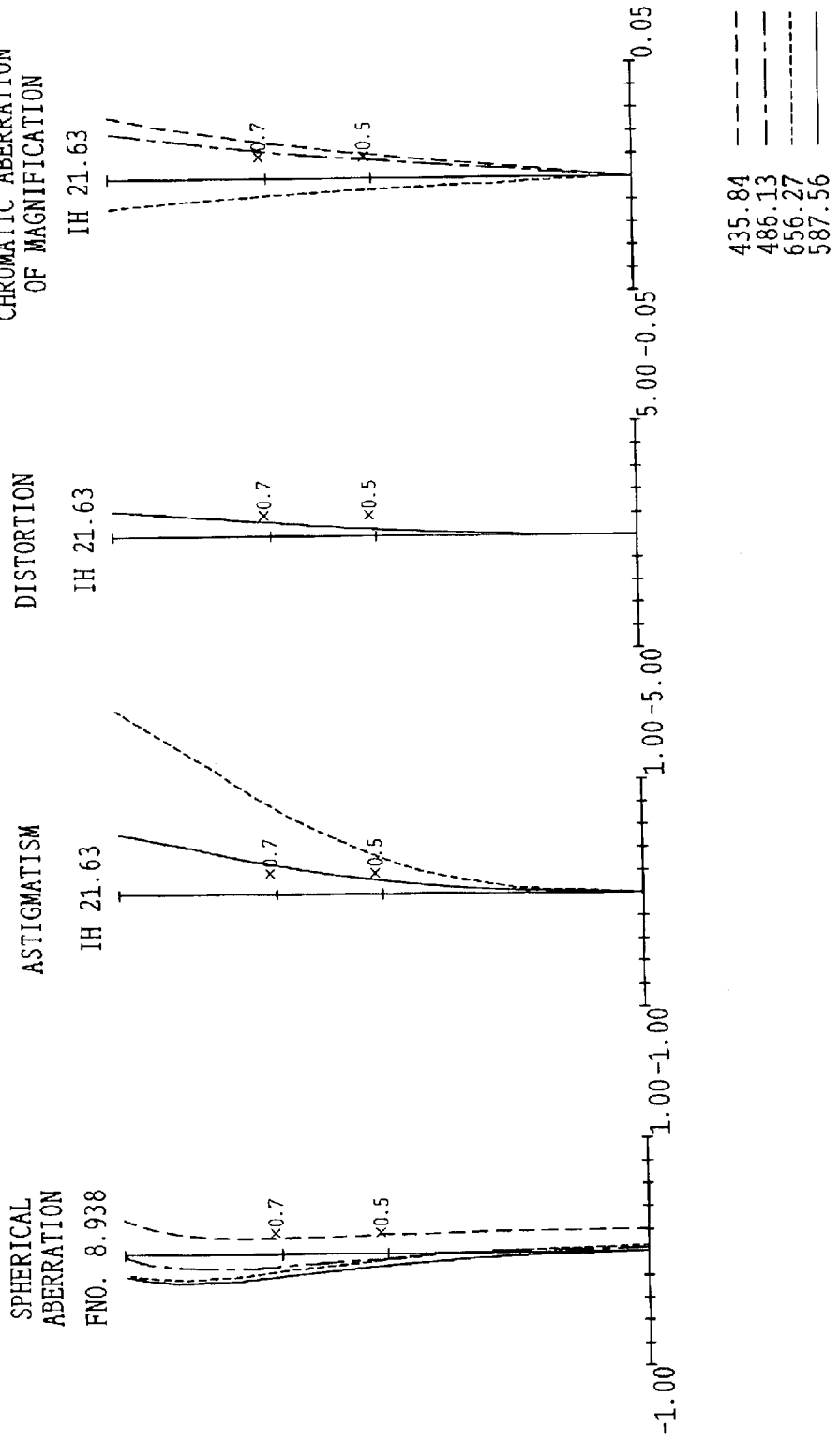

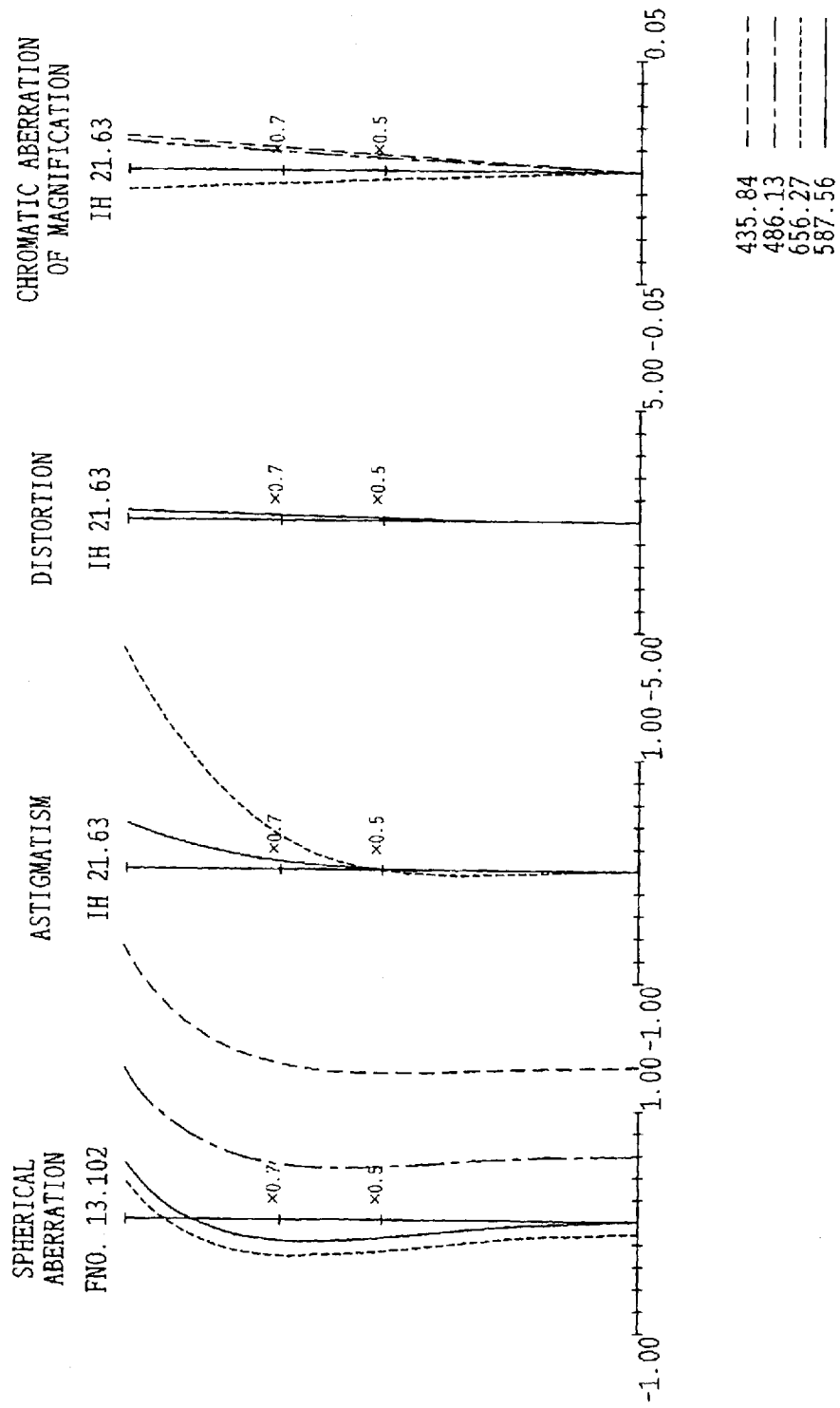

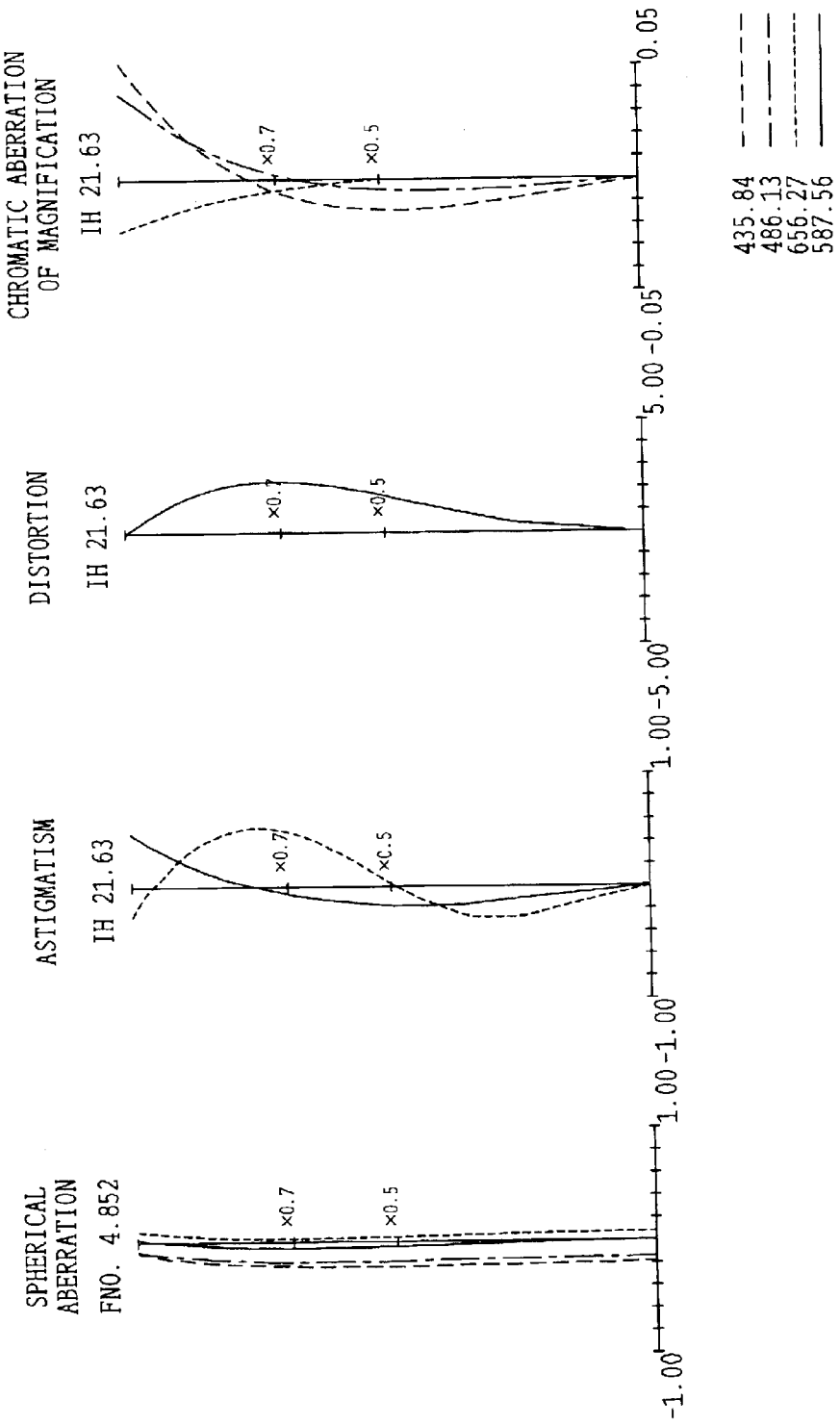

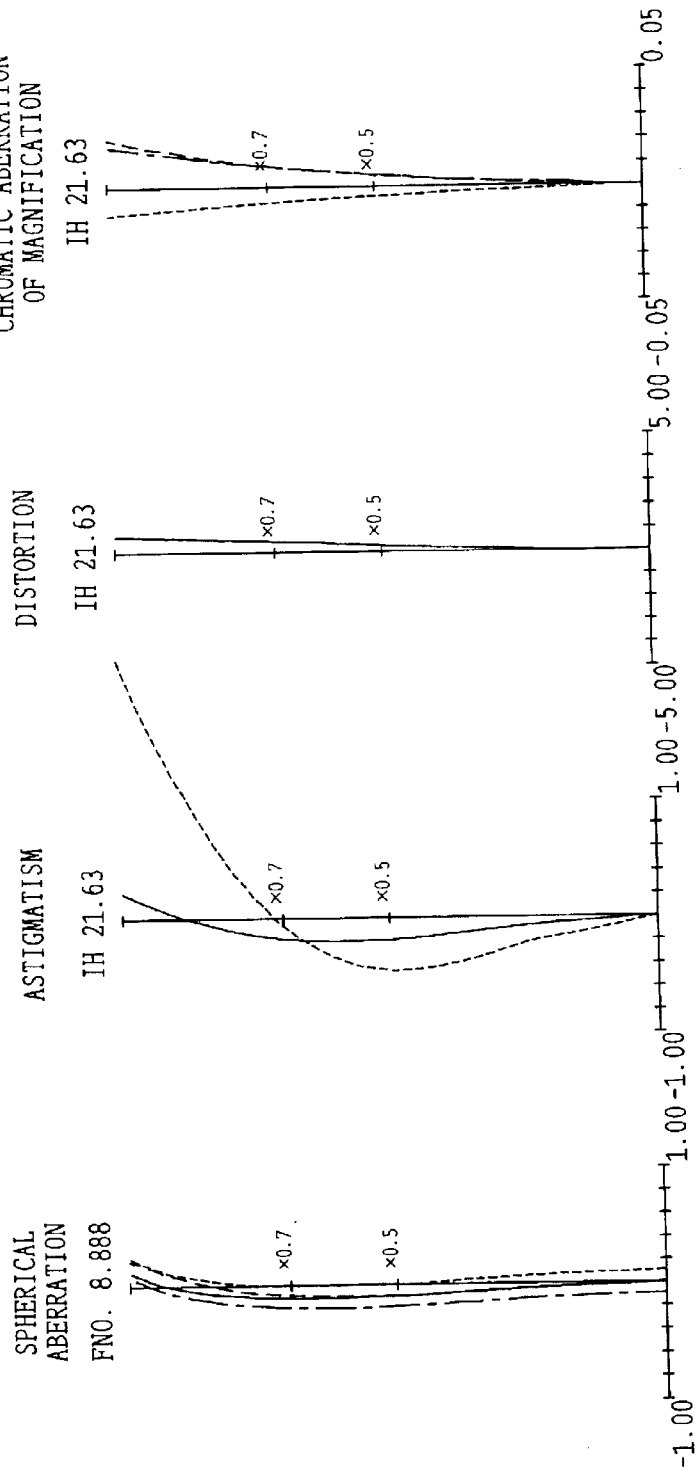

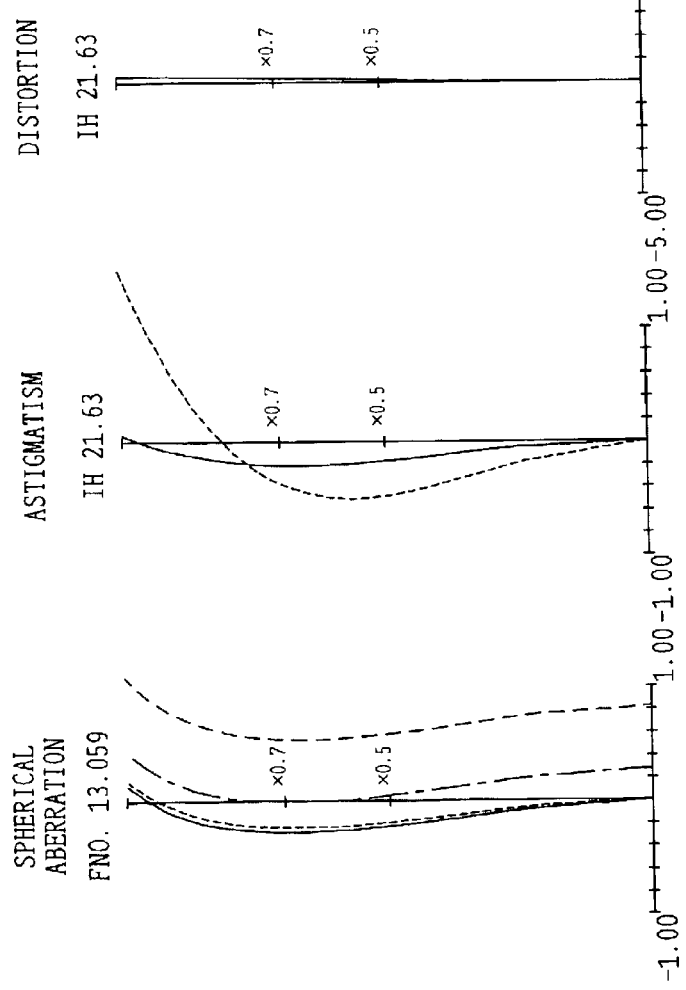

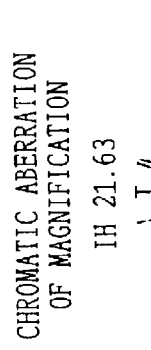

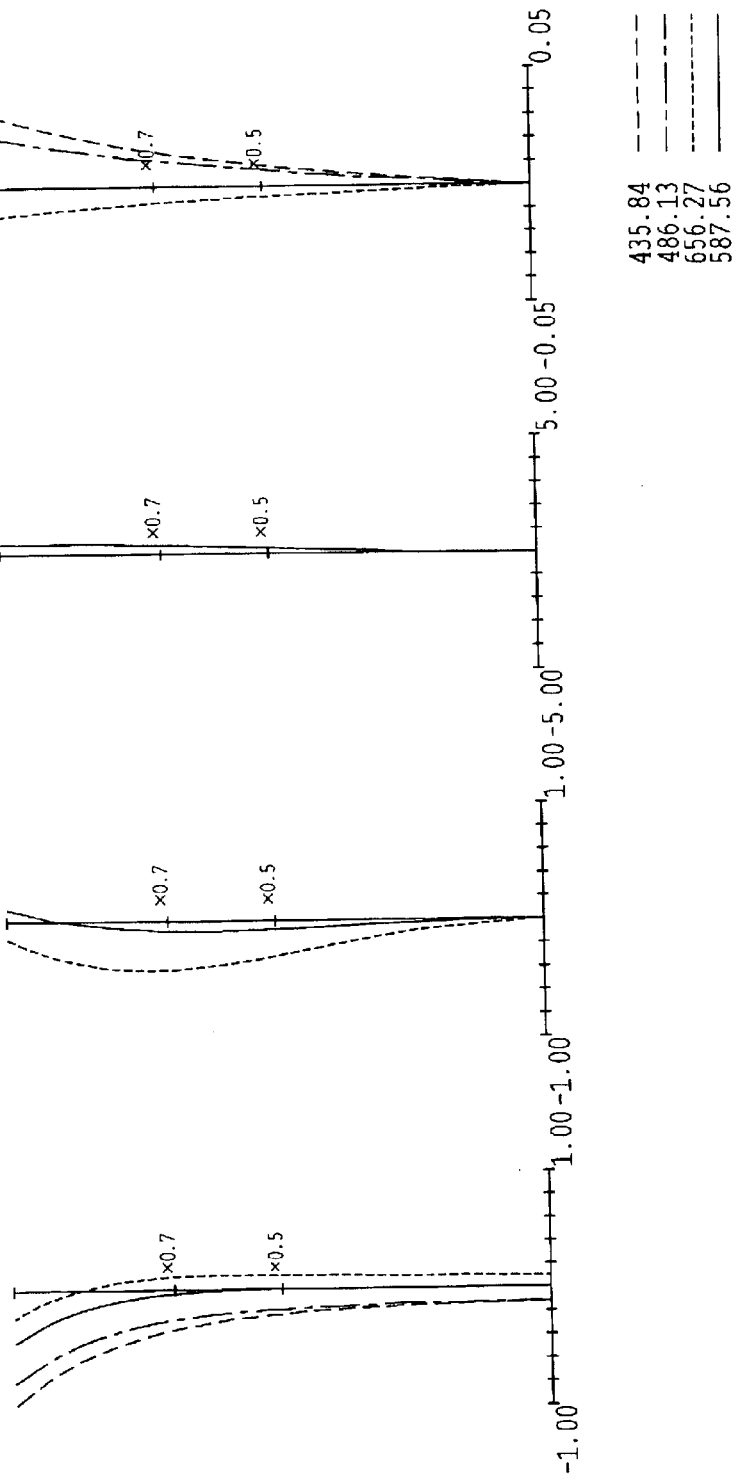

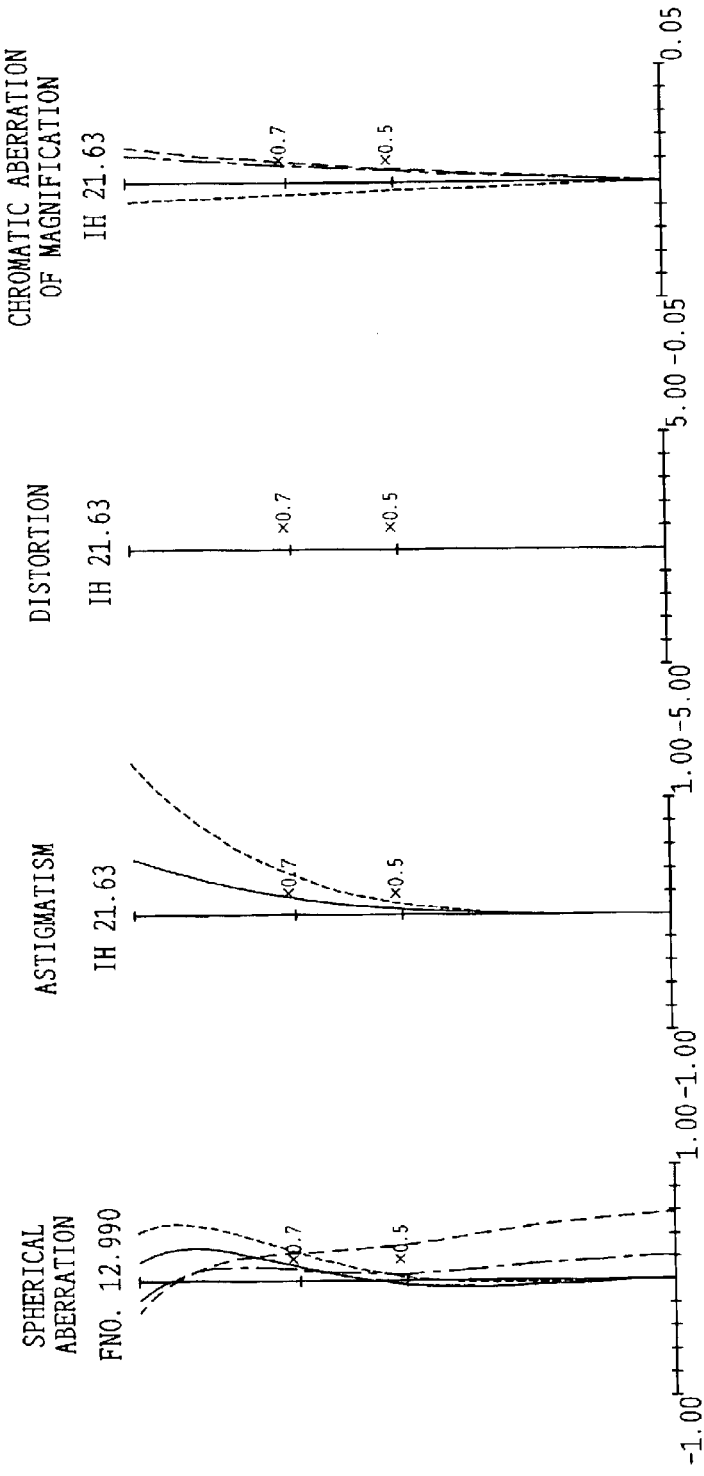

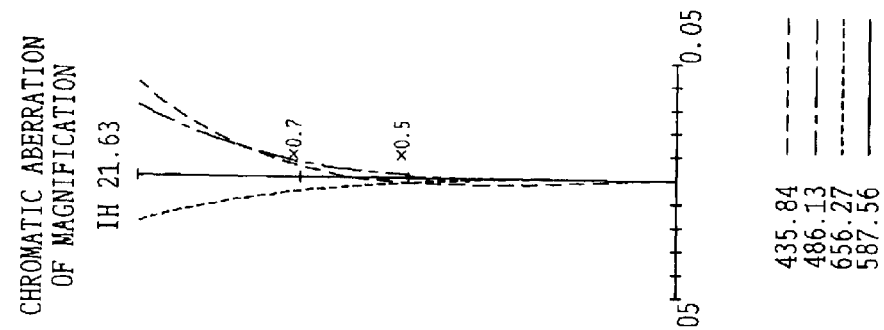
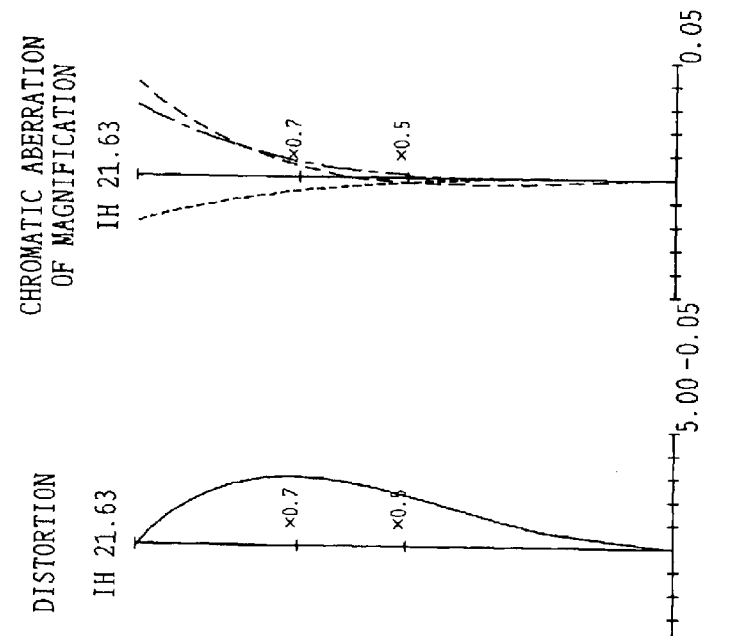
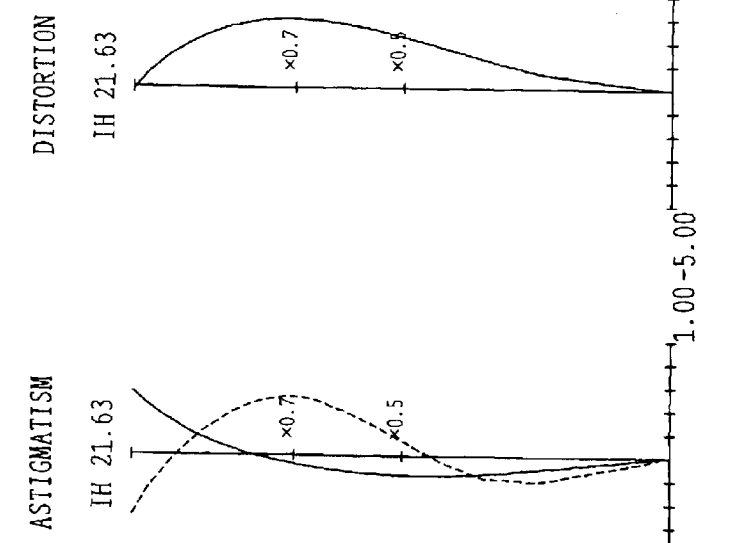
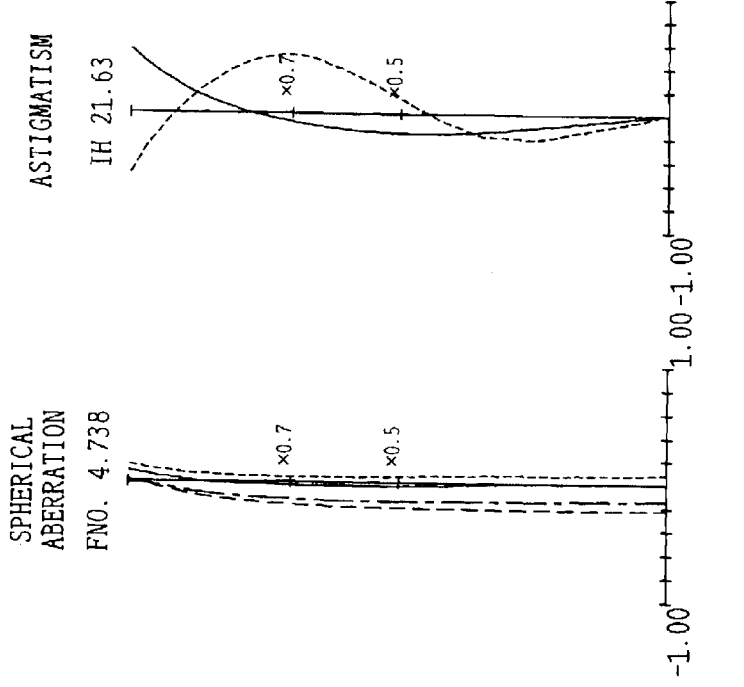

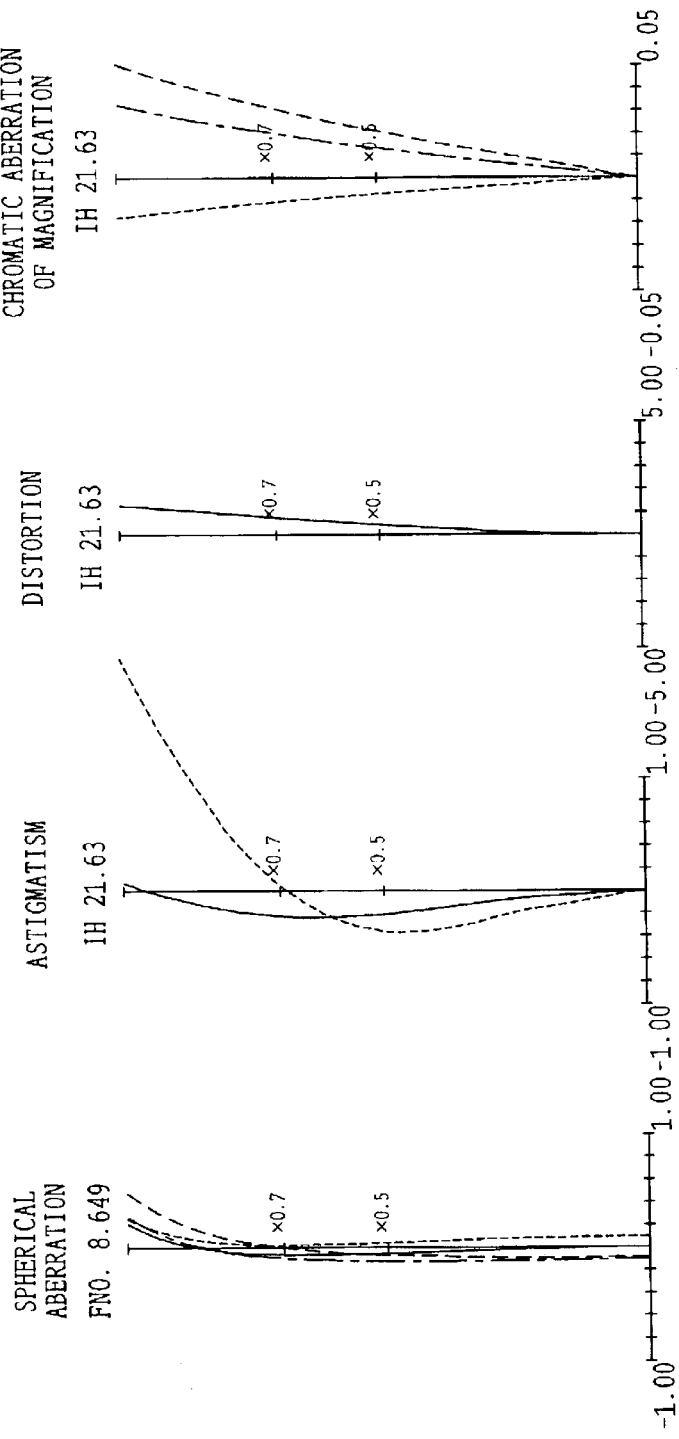

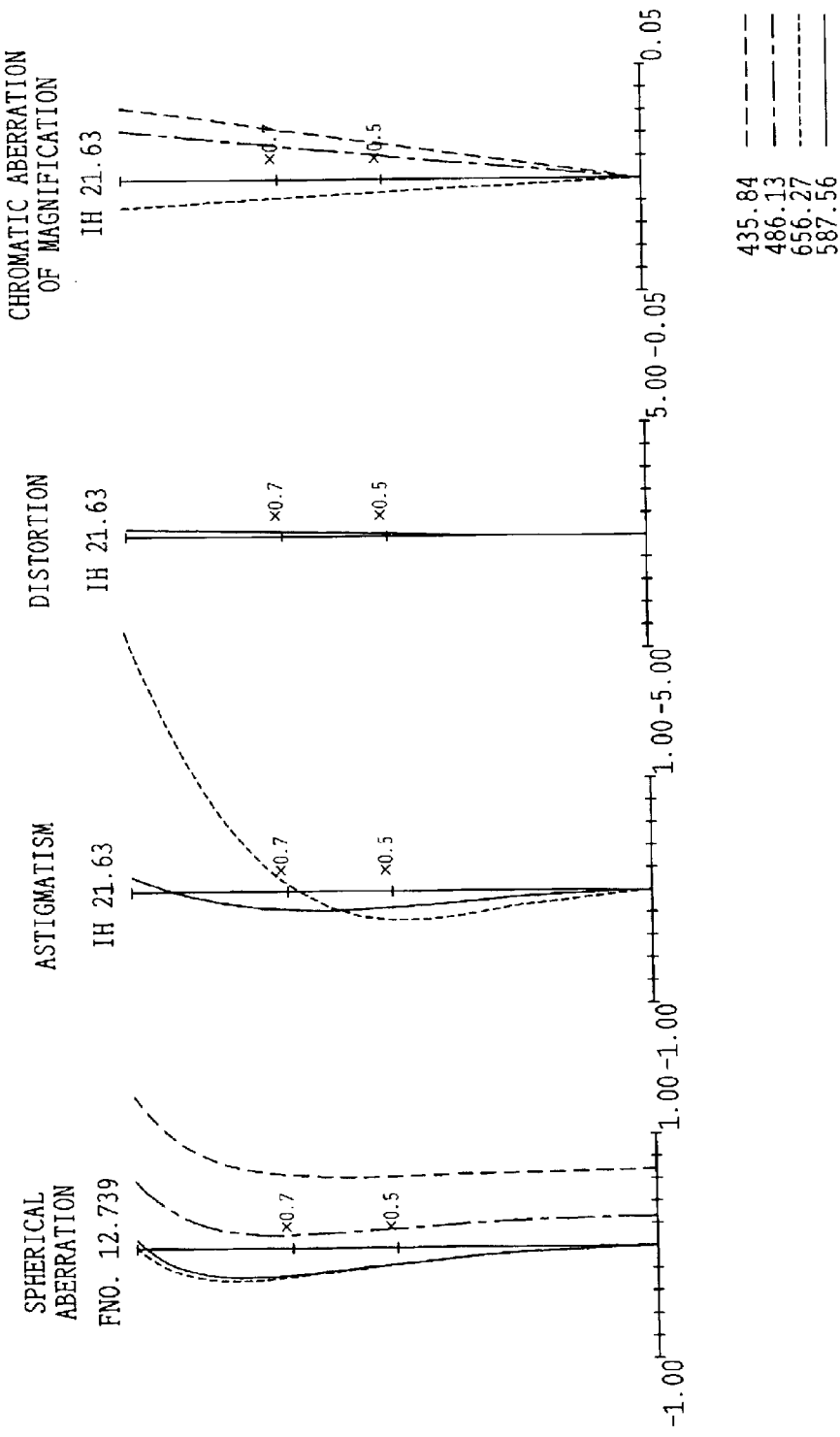

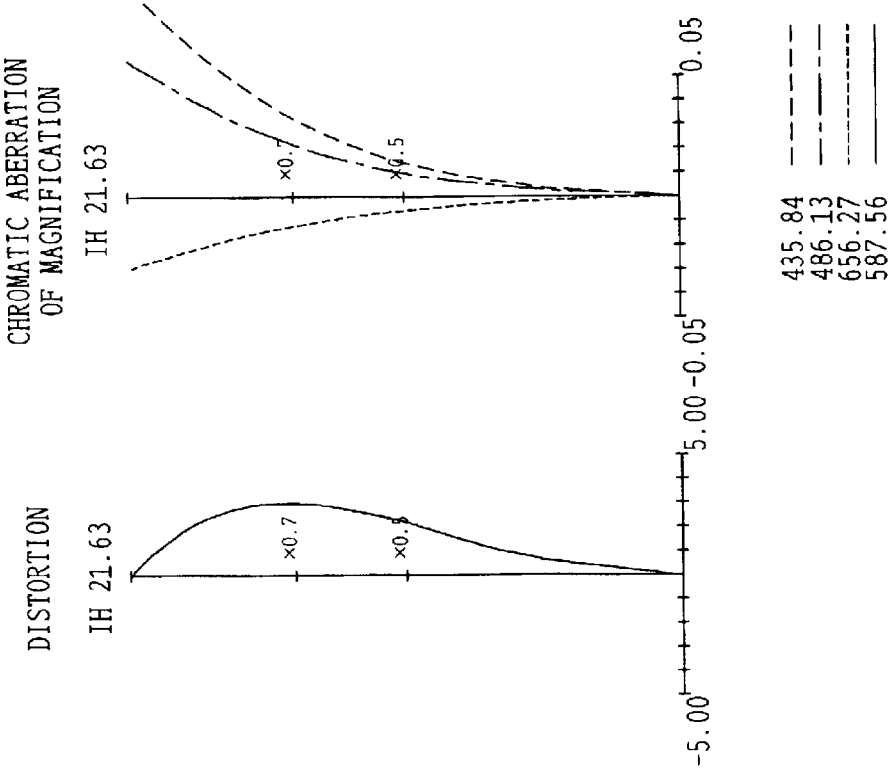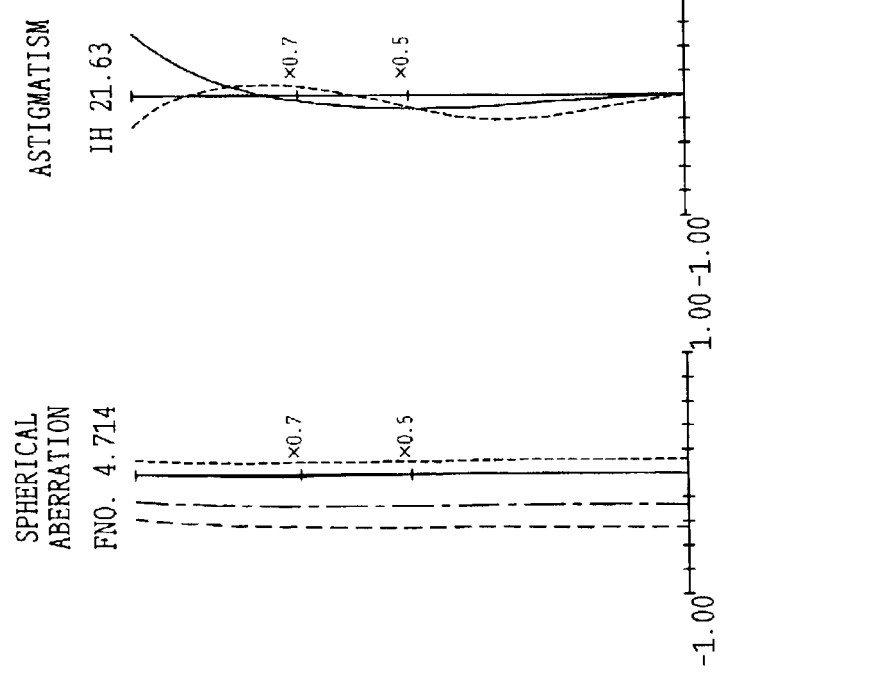

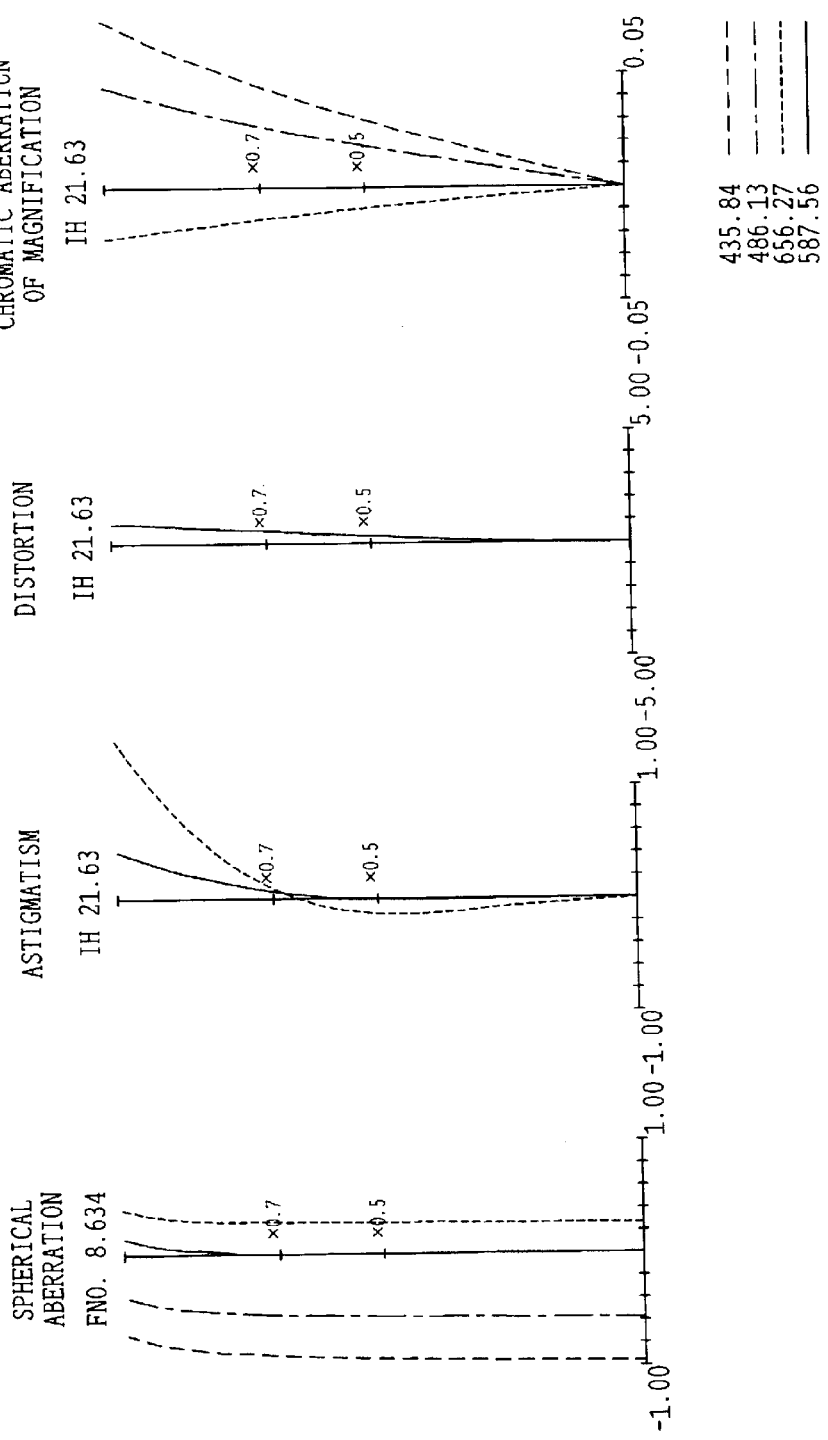

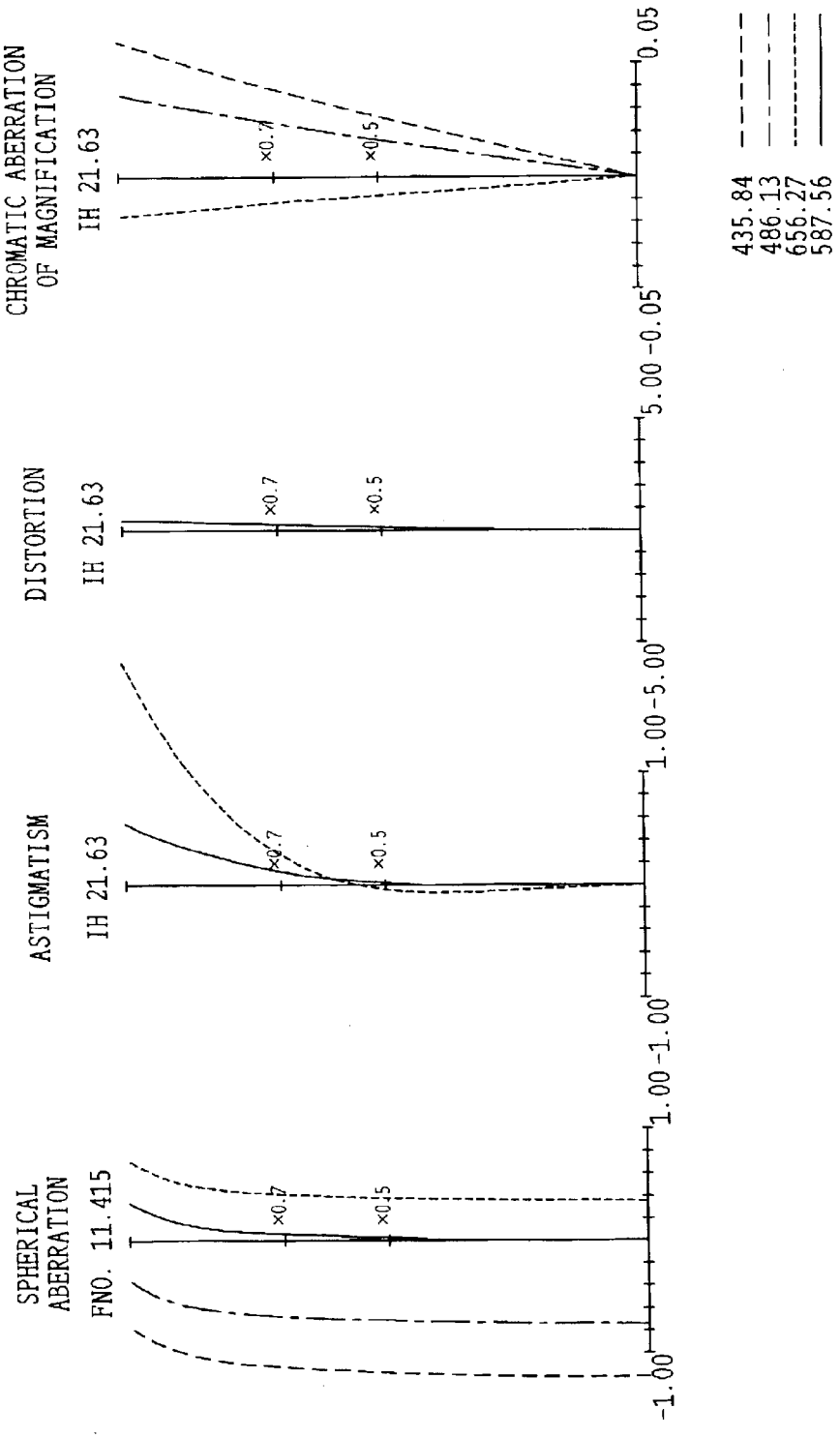

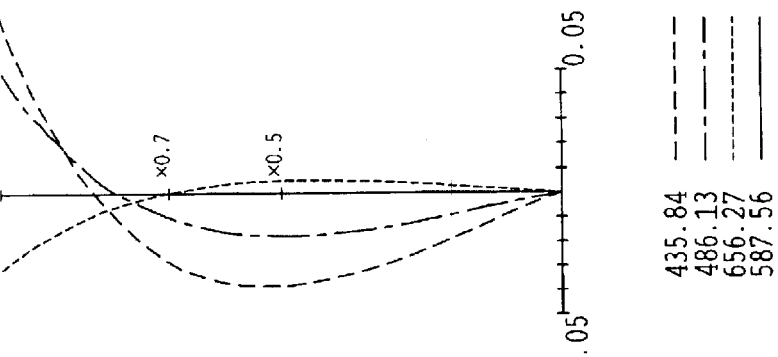

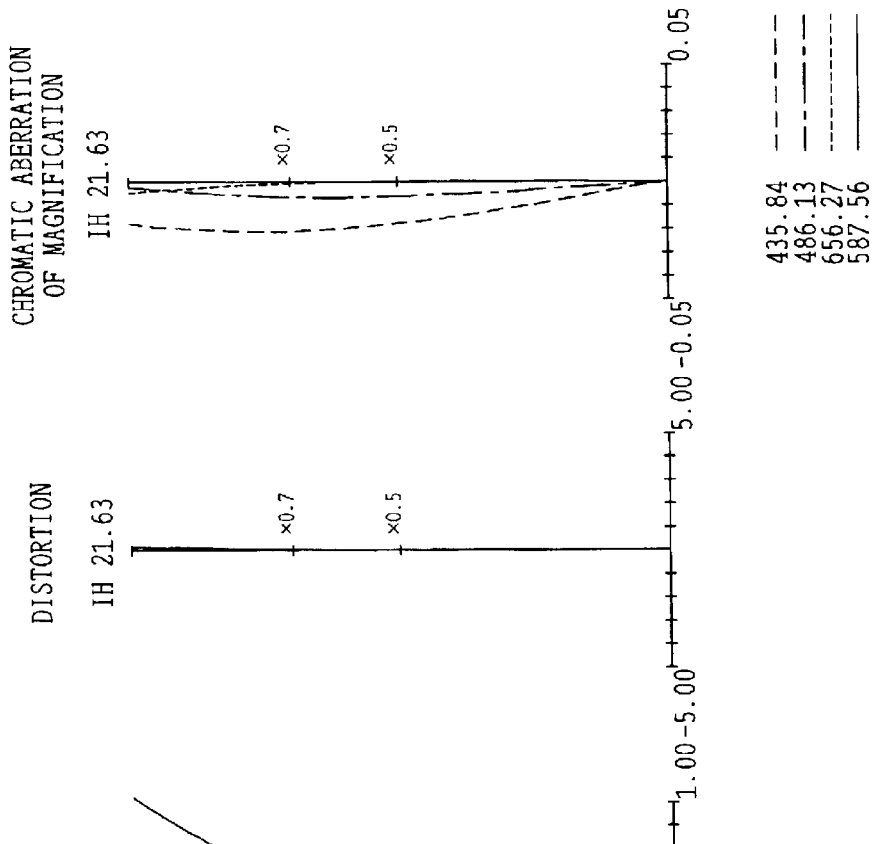

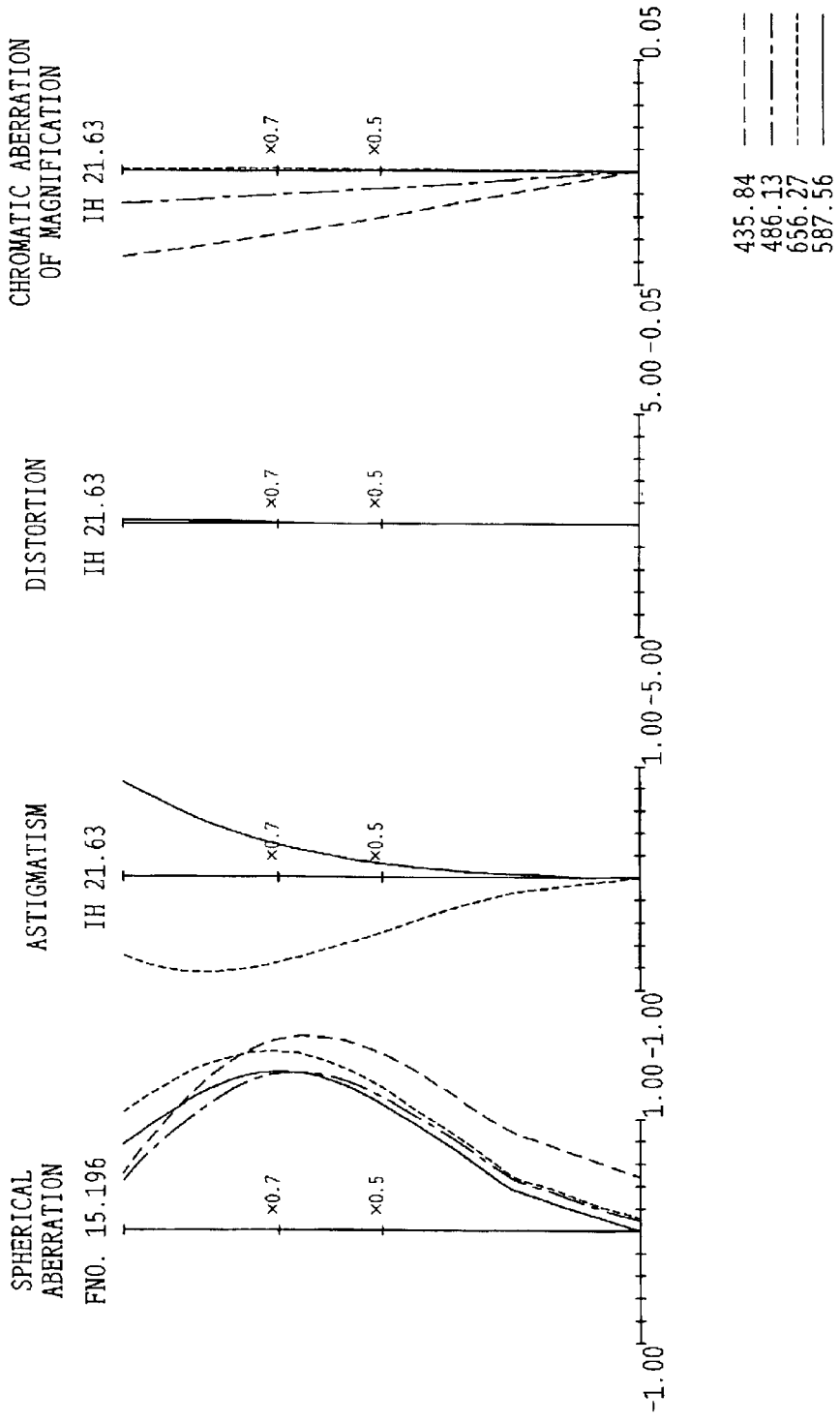

SMALL-SIZED THREE-UNIT ZOOM LENS

BACKGROUND OF THE INVENTION

1. Field of the Invention

The present invention relates to a zoom lens, and in particular, to a three-unit zoom lens which is suitable for a compact camera, small in size, low in cost, and wide in field angle.

2. Description of Related Art

Two-unit zoom lenses which are simple in structure have been often used as zoom lenses for compact cameras. However, in such a zoom lens for compact cameras, demands on a compact design and a high variable magnification ratio have recently increased. In particular, where the magnification of an optical system is changed, the demand on a wide field angle at the wide-angle position has increased. Thus, with the two-unit zoom lens which is simple in structure, there is a limit to the maintenance of a good balance of aberration, extending from the wide-angle position to the telephoto position. As such, a three-unit zoom lens has been chiefly used.

In compact cameras, telephoto-type lens systems in which the last lens unit has negative power are often employed. This is because such a lens system for compact cameras, in contrast with a lens system for single-lens reflex cameras, has the advantage that there is little need to increase the back focal distance or the overall length can be reduced. In particular, in the three-unit zoom lens, the arrangement of lenses with positive, positive, and negative powers is widely used.

Also, in addition to satisfying these demands, a further-cost reduction has been required.

Conventional three-unit zoom lenses are variously proposed by Japanese Patent Kokai Nos. Hei 2-51116, Hei 5-88085, and Hei 7-120677.

A three-unit zoom lens disclosed in Kokai No. Hei 2-51116 has the arrangement of a small number of lens elements. However, the variable magnification ratio fails to reach 2, which is unsatisfactory in view of the high variable magnification ratio. Furthermore, since a gradient index lens is used to correct aberration, fabrication is difficult and a cost reduction cannot be achieved.

A three-unit zoom lens disclosed in Kokai No. Hei 5-88085 uses a small number of lens elements to achieve a wide field angle. However, since the overall length is long and particularly the telephoto ratio at the telephoto position is as high as 1.2, it is difficult to achieve compactness.

A zoom lens disclosed in Kokai No. Hei 7-120677 offers a cost reduction with a small number of lens elements, but is unsatisfactory for the demand on the wide field angle. A zoom lens set forth in Embodiment 5 of this publication has the wide field angle, but shows a high telephoto ratio at the telephoto position, and thus it is unsatisfactory for achieving compactness.

SUMMARY OF THE INVENTION

It is, therefore, an object of the present invention to provide a three-unit zoom lens which is small in size, low in cost, and wide in field angle, but offers favorable performance with a small number of lens elements by properly arranging individual lens units.

In order to accomplish the above object, the three-unit zoom lens in a first aspect of the present invention includes, in order from the object side, a first lens unit with positive refracting power, a second lens unit with positive refracting power, and a third lens unit with negative refracting power. When the magnification of the zoom lens is changed, extending from the wide-angle position to the telephoto position, individual lens units of the three-unit zoom lens are moved toward the object side so that a space between the first lens unit and the second lens unit, after being increased as the lens units are moved from the wide-angle position toward the proximity of the middle position, is decreased as they are moved toward the telephoto position, and a space between the second lens unit and the third lens unit is also decreased accordingly. In this case, the three-unit zoom lens has a variable magnification ratio of 2 or higher and the first lens unit is constructed with a single lens element.

The three-unit zoom lens in a second aspect of the present invention includes, in order from the object side, a first lens unit with positive refracting power, a second lens unit with positive refracting power, and a third lens unit with negative refracting power. When the magnification of the zoom lens is changed, extending from the wide-angle position to the telephoto position, spaces between individual lens units are changed. In this case, the first lens unit is constructed with a single lens element of positive refracting power, having a concave surface directed toward the object side.

In the three-unit zoom lens in the first or second aspect of the present invention, the first lens unit has at least one aspherical surface and is constructed of plastic.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 2A, 2B, 2C, and 2D are diagrams showing aberration characteristics at the wide-angle position in the first embodiment;

FIGS. 3A, 3B, 3C, and 3D are diagrams showing aberration characteristics at the middle position in the first embodiment;

FIGS. 4A, 4B, 4C, and 4D are diagrams showing aberration characteristics at the telephoto position in the first embodiment;

FIGS. 6A, 6B, 6C, and 6D are diagrams showing aberration characteristics at the wide-angle position in the second embodiment;

FIGS. 7A, 7B, 7C, and 7D are diagrams showing aberration characteristics at the middle position in the second embodiment;

FIGS. 8A, 8B, 8C, and 8D are diagrams showing aberration characteristics at the telephoto position in the second embodiment;

FIGS. 10A, 10B, 10C, and 10D are diagrams showing aberration characteristics at the wide-angle position in the third embodiment;

FIGS. 11A, 11B, 11C, and 11D are diagrams showing aberration characteristics at the middle position in the third embodiment;

FIGS. 12A, 12B, 12C, and 12D are diagrams showing aberration characteristics at the telephoto position in the third embodiment;

FIGS. 14A, 14B, 14C, and 14D are diagrams showing aberration characteristics at the wide-angle position in the fourth embodiment;

FIGS. 15A, 15B, 15C, and 15D are diagrams showing aberration characteristics at the middle position in the fourth embodiment;

FIGS. 16A, 16B, 16C, and 16D are diagrams showing aberration characteristics at the telephoto position in the fourth embodiment;

FIGS. 18A, 18B, 18C, and 18D are diagrams showing aberration characteristics at the wide-angle position in the fifth embodiment;

FIGS. 19A, 19B, 19C, and 19D are diagrams showing aberration characteristics at the middle position in the fifth embodiment;

FIGS. 20A, 20B, 20C, and 20D are diagrams showing aberration characteristics at the telephoto position in the fifth embodiment;

FIGS. 22A, 22B, 22C, and 22D are diagrams showing aberration characteristics at the wide-angle position in the sixth embodiment;

FIGS. 23A, 23B, 23C, and 23D are diagrams showing aberration characteristics at the middle position in the sixth embodiment;

FIGS. 24A, 24B, 24C, and 24D are diagrams showing aberration characteristics at the telephoto position in the sixth embodiment;

DETAILED DESCRIPTION OF THE PREFERRED EMBODIMENTS

Before the description of the embodiments, reference is made to the basic arrangement and the function and effect of the three-unit zoom lens according to the present invention.

Figure 1A:
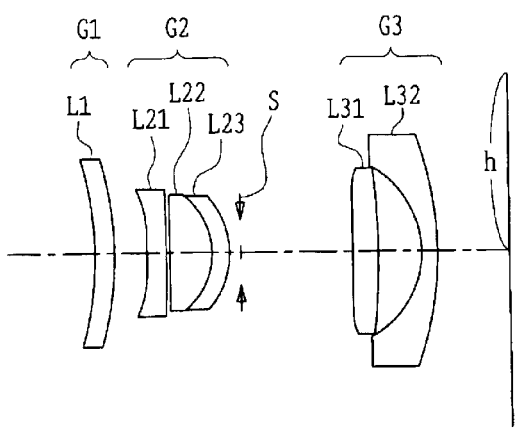
FIGS. 1A, 1B, and 1C are sectional views showing lens arrangements, developed along the optical axis, at wide-angle, middle, and telephoto positions, respectively, in a first embodiment of the three-unit zoom lens according to present invention.
Figure 1B:
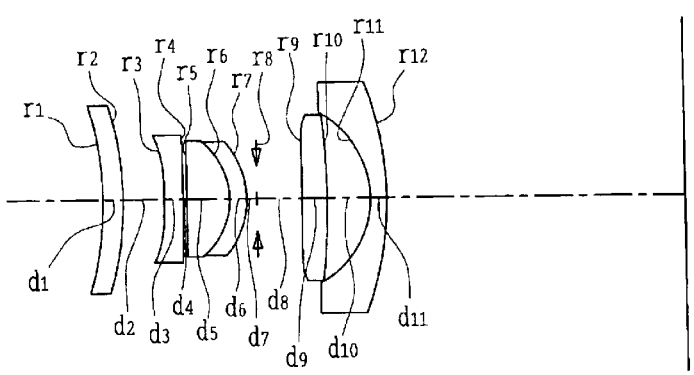
Figure 1C:
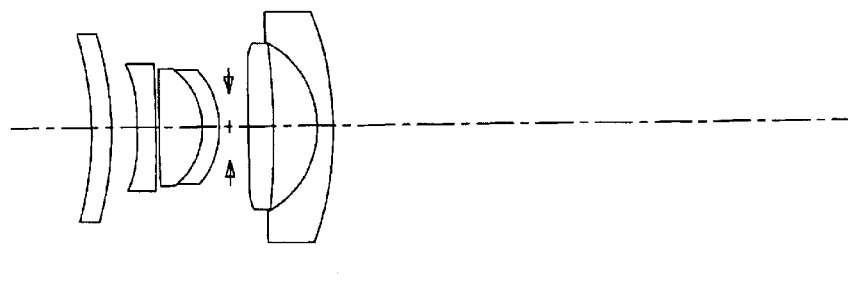

The three-unit zoom lens according to the present invention, as shown in FIGS. 1A–1C, includes, in order from the object side, a first lens unit G1 with positive refracting power, a second lens unit G2 with positive refracting power, and a third lens unit G3 with negative refracting power, and is constructed so that when the magnification of the zoom lens is changed, extending from the wide-angle position to the telephoto position, spaces between individual lens units are changed.

In the present invention, the first lens unit G1 is constructed with a single lens element of positive refracting power.

In order to reduce the degradation of performance caused by a manufacturing error in the zoom lens, it is important to suppress residual aberrations in individual lens units. As a means for this, an arrangement such that optical elements of positive refracting power and negative refracting power, at least one for each power, are provided in the first lens unit has been often used. However, an increase of the number of lens elements brings about a cost rise. In contrast to this, when the first lens unit is constructed with a single lens element as in the present invention, there is the advantage of reducing cost.

In the three-unit zoom lens, the first lens unit is such that its outside diameter becomes large according to a distance to an aperture stop which is longer than in the second lens unit. In this view also, when the first lens unit, as in the present invention, is constructed with a single lens element to reduce the number of lens elements, cost advantages are derived.

For a lens frame unit, the use of the first lens unit situated at the top of a lens frame, as a single lens element, offers the lightweight design of the first lens unit and is advantageous for the design of a lens frame driving system.

Moreover, when the first lens unit is constructed with the single lens element, there is no need to consider a lens center for assembly in the first lens unit, and there is the merit of stabilizing performance. This also serves to reduce the man-hour of assembly.

Where a wide field angle design is attempted, correction for distortion is important. In the present invention, therefore, the first lens unit is constructed with a single lens element of positive refracting power, having a concave surface directed toward the object side.

When the concave surface is directed toward the object side, the effect of correcting distortion in a negative direction is brought about. When a lens system is particularly designed to have the wide field angle, perspective image distortion is considerably produced at the wide-angle position. However, negative distortion has the characteristic that the perspective image distortion is made to appear small. Thus, when the concave surface is directed toward the object side as in the present invention, there is the advantage of making it hard to recognize distortion in a lens of the wide field angle.

In the present invention, it is desirable that the single lens element with positive refracting power has at least one aspherical surface.

By doing so, not only can performance be made favorable over the entire system of the zoom lens, but also residual aberration occurring in the first lens unit can be minimized, with the result that the performance is stabilized.

In the present invention, it is desirable that such an aspherical lens element is constructed of plastic.

In recent years, the aspherical lens element has come more and more into use as a favorable means for correction for aberration. However, an aspherical glass lens element is still more costly than a spherical glass lens element, and a cost reduction is obstructed. In contrast to this, an aspherical plastic lens element is less expensive than the glass lens element, thus bringing about a further effect on the cost reduction.

In the present invention, when the magnification of the zoom lens is changed, extending from the wide-angle position to the telephoto position, individual lens units of the three-unit zoom lens are moved toward the object side so that a space between the first lens unit and the second lens unit, after being increased as the lens units are moved from the wide-angle position toward the proximity of the middle position, is decreased as they are moved toward the telephoto position, and a space between the second lens unit and the third lens unit is also decreased accordingly.

When the magnification is changed over the range from the wide-angle position to the telephoto position, the space between the first lens unit and the second lens unit has often been merely increased. In contrast to this, in the zoom lens in the first or second aspect of the present invention, as the lens units are moved from the wide-angle position toward the proximity of the middle position, the space between the first lens unit and the second lens unit is increased and thereby curvature of field is chiefly corrected. As the lens units are moved from the proximity of the middle position toward the telephoto position, the space between the first lens unit and the second lens unit is decreased and thereby a reduction in the overall length is achieved.

Also, by narrowing the space between the first lens unit and the second lens unit at the telephoto position, the position of a combined principal point of the first lens unit and the second lens unit is shifted to the third lens unit side. This is advantageous for ensuring the space between the second lens unit and the third lens unit, resulting in a high variable magnification ratio.

In the present invention, it is desirable that the third lens unit includes, in order from the object side, a plastic lens element with weak power, having at least one aspherical surface, and a negative lens element.

The third lens unit, in contrast with other lens units, has an especially large lens diameter. Thus, even when three or more lens elements are used in the third lens unit, cost is merely increased. In addition, when the lens frame is constructed as collapsible mount, collapsing thickness and weight are increased, which impairs compactness.

It is sufficiently possible for performance to replace the third lens unit with a single lens element having an aspherical surface. However, the third lens unit requires stronger refractive power than in other lens units because the telephoto ratio is made low in order to constitute a telephoto type. As such, if the third lens unit is replaced with a single aspherical plastic lens element, it becomes difficult to maintain constant performance in various working circumstances.

Where the third lens unit uses a hybrid aspherical lens element in which the lens diameter is large, as mentioned above, and a resin-layer aspherical surface is configured on the base of the aspherical glass lens element or the spherical glass lens element, a very high cost is entailed. Hence, it is desirable that the third lens unit is constructed with two lens elements such as those described above.

In the present invention in the first aspect, the zoom lens is designed to satisfy the following condition:

$$2.0 < ft/fw \tag{1}$$

where ft is the focal length at a long focal length position of the entire system of the third-unit zoom lens and fw is the focal length at a short focal length position of the entire system of the three-unit zoom lens.

Here, ft/fw stands for a variable magnification ratio. If the value of ft/fw is below the lower limit of Condition (1), a demand for a high variable magnification ratio (a wide variable magnification range) will cease to be met.

In the present invention, it is desirable that the second lens unit is constructed with at least two lens elements. That is, in order to increase the variable magnification ratio, it is desirable that a large variable magnification effect is secured by the second lens unit. When the second lens unit is constructed with at least two lens elements, it becomes easy to increase the variable magnification ratio while maintaining performance. When it is constructed with lens elements variously combining at least two kinds of refractive indices and Abb's numbers, chromatic aberration which is produced in the second lens unit and enlarged in the third lens unit can be minimized. This arrangement may be made so that the chromatic aberration is minimized along with the first lens unit.

In the present invention, it is desirable to satisfy the following condition:

$$2.3 < ft/fw < 3.2 \tag{1'}$$

If the value of ft/fw exceeds the upper limit of Condition (1'), it becomes difficult to construct the first lens unit with a single lens element to correct aberration. On the other hand, if the value is below the lower limit and the number of lens elements is increased in order to correct aberration, the lens system will become oversize.

In the present invention, it is also desirable to satisfy the following condition:

$$0 < ft/fl_{G1} < 0.5 \tag{2}$$

where $fl_{G1}$ is the focal length of the first lens unit.

If the value of $ft/fl_{G1}$ is below the lower limit of Condition (2), the relative power of the first lens unit becomes extremely weak to cause an increase of the telephoto ratio at the long focal length and a demand for compactness will cease to be met. On the other hand, if the value exceeds the upper limit, residual aberration will be increased in the first lens unit to cause an increase of the degradation of performance due to a manufacturing error.

According to the present invention, since the first lens unit is constructed with a single lens element alone, the aperture stop is interposed between the second lens unit and the third lens unit and thereby is located at about the center of the zoom lens system. Therefore, the height of a ray incident on each lens unit can be lowered, and thus the outside diameter of the entire zoom lens system can be diminished.

When the magnification of the zoom lens system is changed, the aperture stop is moved integrally with the second lens unit. By doing so, the moving mechanisms of the second lens unit and the aperture stop are integrally constructed and cost can be reduced.

The embodiments of the present invention will be described below.

First Embodiment

FIGS. 1A–1C show lens arrangements in the first embodiment of the three-unit zoom lens according to present invention. FIGS. 2A–2D, 3A–3D, and 4A–4D show aberration characteristics in the first embodiment.

The three-unit zoom lens in the first embodiment includes, in order from the object side, the first lens unit G1 with positive power, the second lens unit G2 with positive power, a stop S, and the third lens unit G3 with negative power.

The first lens unit G1 with positive power is constructed with a single positive meniscus lens L1 made of plastic, directing a concave surface toward the object side and having an aspherical surface on the image side.

The second lens unit G2 with positive power is constructed with, in order from the object side, a negative meniscus lens L21 directing a concave surface toward the object side and having aspherical surfaces on both sides, and a cemented doublet which includes a positive meniscus lens L22 directing a concave surface toward the object side and a negative meniscus lens L23 directing a concave surface toward the object side.

The third lens unit G3 with negative power is constructed with a plastic positive meniscus lens L31 with weak power, directing a concave surface toward the object side and having aspherical surfaces on both sides and a negative meniscus lens L32 directing a concave surface toward the object side.

A zoom system that individual lens units are moved toward the object side is adopted so that when the magnification of the zoom lens is changed, extending from the wide-angle position to the telephoto position, a space between the first lens unit G1 and the second lens unit G2, after being increased as the lens units are moved from the wide-angle angle position toward the proximity of the middle position, is decreased as they are moved toward the telephoto position, and a space between the second lens unit G2 and the third lens unit G3 is also decreased accordingly.

The stop S is moved integrally with the second lens unit G2.

Subsequently, lens data of optical members constituting the three-unit zoom lens of the first embodiment are listed below.

Also, in the numerical data of the first embodiment, $r_1$, $r_2$, ... denote radii of curvature of individual lens surfaces; $d_1$, $d_2$, ... denote thicknesses of individual lenses or air spaces between them; $n_{d1}$, $n_{d2}$, ... denote refractive indices of individual lenses at the d line; $\nu_{d1}$, $\nu_{d2}$, ... denote Abbe's numbers of individual lenses, Fno denotes an F-number, and f denotes the focal length of the three-unit zoom lens.

Also, when z is taken as the coordinate in the direction of the optical axis, y is taken as the coordinate normal to the optical axis, K represents a conic coefficient, and $A_4$, $A_6$, $A_8$, and $A_{10}$ represent aspherical coefficients, the configuration of each of the aspherical surfaces is expressed by the following equation:

$$z=(y^2/r)/[1+\{1-(1+K)(y/r)^2\}^{1/2}]+A_4 y^4+A_6 y^6+A_8 y^8+A_{10} y^{10}$$

These symbols hold for the numerical data of the embodiments to be described later.

Numerical data 1

| | | | |
|---|---|---|---|
| $r_1 = -34.500$ | $d_1 = 2.00$ | $n_{d1} = 1.52542$ | $\nu_{d1} = 55.78$ |
| $r_2 = -34.959$ (aspherical) | $d_2 = D\,2$ | | |
| $r_3 = -51.527$ (aspherical) | $d_3 = 2.00$ | $n_{d3} = 1.58423$ | $\nu_{d3} = 30.49$ |
| $r_4 = -136.595$ (aspherical) | $d_4 = 0.33$ | | |
| $r_5 = -1800.977$ | $d_5 = 4.25$ | $n_{d5} = 1.51633$ | $\nu_{d5} = 64.14$ |
| $r_6 = -7.175$ | $d_6 = 1.66$ | $n_{d6} = 1.78470$ | $\nu_{d6} = 26.29$ |
| $r_7 = -9.112$ | $d_7 = 1.00$ | | |
| $r_8 = \infty$ (stop) | $d_8 = D\,8$ | | |
| $r_9 = -104.071$ (aspherical) | $d_9 = 2.5300$ | $n_{d9} = 1.58423$ | $\nu_{d9} = 30.49$ |
| $r_{10} = -46.732$ (aspherical) | $d_{10} = 4.2910$ | | |

-continued

Numerical data 1

| | | | |
|---|---|---|---|
| $r_{11} = -9.200$ | $d_{11} = 1.5000$ | $n_{d11} = 1.77250$ | $\nu_{d11} = 49.60$ |
| $r_{12} = -35.103$ | | | |

Zoom data

| | Wide-angle | Middle | Telephoto |
|---|---|---|---|
| F n o | 4.9 | 8.9 | 13.1 |
| f | 28.84 | 52.90 | 77.60 |
| D 2 | 2.98 | 4.00 | 2.48 |
| D 8 | 10.70 | 4.40 | 2.00 |

Figure 5A:
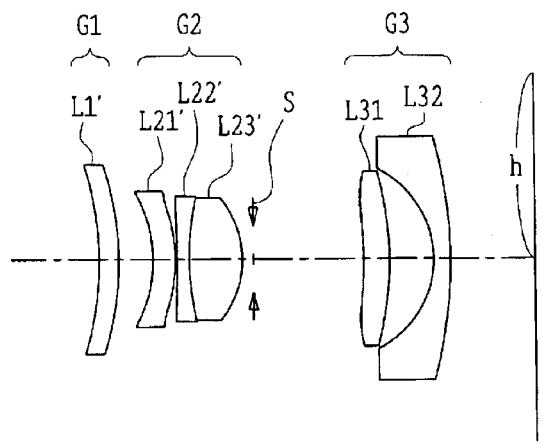
FIGS. 5A, 5B, and 5C are sectional views showing lens arrangements, developed along the optical axis, at wide-angle, middle, and telephoto positions, respectively, in a second embodiment of the three-unit zoom lens according to present invention.
Figure 5B:
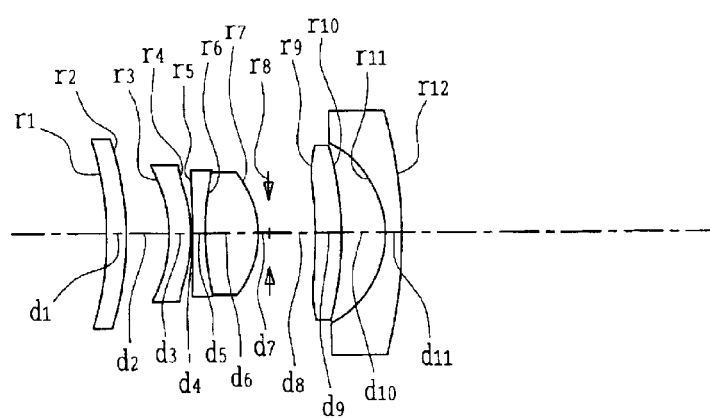
Figure 5C:
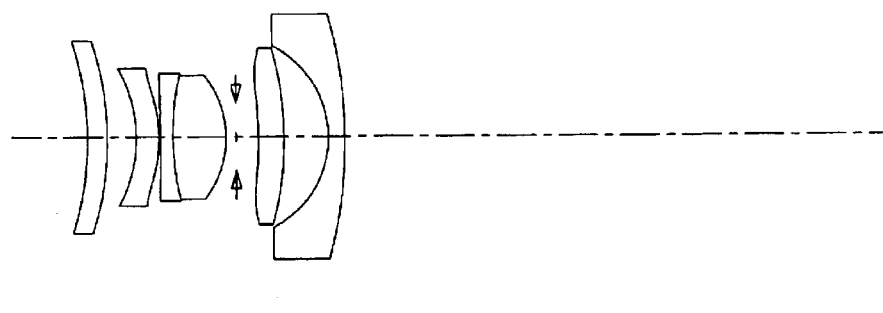

Aspherical coefficients
Second surface $K = 0.0$
$A_4 = 4.0636 \times 10^{-5}$  $A_6 = -8.9256 \times 10^{-7}$  $A_8 = 5.2008 \times 10^{-9}$
$A_{10} = -2.3064 \times 10^{-12}$ Third surface $K = 0.0$
$A_4 = -3.0807 \times 10^{-4}$  $A_6 = -6.3835 \times 10^{-6}$  $A_8 = 1.6229 \times 10^{-7}$
$A_{10} = -1.9954 \times 10^{-9}$ Fourth surface $K = 0.0$
$A_4 = -6.7946 \times 10^{-5}$  $A_6 = -2.7308 \times 10^{-6}$  $A_8 = 1.8182 \times 10^{-7}$
$A_{10} = 0.0$ Ninth surface $K = 0.0$
$A_4 = 1.9687 \times 10^{-4}$  $A_6 = -8.7015 \times 10^{-7}$  $A_8 = -1.4544 \times 10^{-8}$
$A_{10} = 3.7282 \times 10^{-10}$ Tenth surface $K = 0.0$
$A_4 = 9.5491 \times 10^{-5}$  $A_6 = 6.2519 \times 10^{-7}$  $A_8 = -5.3296 \times 10^{-8}$
$A_{10} = 5.2849 \times 10^{-10}$ Second Embodiment FIGS. 5A–5C show lens arrangements in the second embodiment of the three-unit zoom lens according to present invention. FIGS. 6A–6D, 7A–7D, and 8A–8D show aberration characteristics in the second embodiment.

The three-unit zoom lens in the second embodiment includes, in order from the object side, the first lens unit G1 with positive power, the second lens unit G2 with positive power, the stop S, and the third lens unit G3 with negative power.

The first lens unit G1 with positive power is constructed with a single positive meniscus lens L1' made of plastic, directing a concave surface toward the object side and having an aspherical surface on the object side.

The second lens unit G2 with positive power is constructed with, in order from the object side, a negative meniscus lens L21' directing a concave surface toward the object side and having aspherical surfaces on both sides, and a cemented doublet which includes a negative biconcave lens L22' and a positive biconvex lens L23'.

The third lens unit G3 with negative power is constructed with the plastic positive meniscus lens L31 with weak power, directing a concave surface toward the object side and having aspherical surfaces on both sides and the negative meniscus lens L32 directing a concave surface toward the object side.

A zoom system that individual lens units are moved toward the object side is adopted so that when the magnification of the zoom lens is changed, extending from the wide-angle position to the telephoto position, a space between the first lens unit G1 and the second lens unit G2, after being increased as the lens units are moved from the wide-angle position toward the proximity of the middle position, is decreased as they are moved toward the telephoto position, and a space between the second lens unit G2 and the third lens unit G3 is also decreased accordingly.

The stop S is moved integrally with the second lens unit G2.

Subsequently, lens data of optical members constituting the three-unit zoom lens of the second embodiment are listed below.

Numerical data 2

| | | | |
|---|---|---|---|
| $r_1 = -33.000$ (aspherical) | $d_1 = 2.00$ | $n_{d1} = 1.58423$ | $v_{d1} = 30.49$ |
| $r_2 = -30.313$ | $d_2 = D\,2$ | | |
| $r_3 = -15.650$ (aspherical) | $d_3 = 2.00$ | $n_{d3} = 1.58423$ | $v_{d3} = 30.49$ |
| $r_4 = -15.168$ (aspherical) | $d_4 = 0.20$ | | |
| $r_5 = -148.747$ | $d_5 = 1.22$ | $n_{d5} = 1.80518$ | $v_{d5} = 25.42$ |
| $r_6 = 27.082$ | $d_6 = 5.00$ | $n_{d6} = 1.51742$ | $v_{d6} = 52.43$ |
| $r_7 = -9.210$ | $d_7 = 1.00$ | | |
| $r_8 = \infty$ (stop) | $d_8 = D\,8$ | | |
| $r_9 = -49.774$ (aspherical) | $d_9 = 2.53$ | $n_{d9} = 1.58423$ | $v_{d9} = 30.49$ |
| $r_{10} = -30.155$ (aspherical) | $d_{10} = 4.18$ | | |
| $r_{11} = -9.100$ | $d_{11} = 1.50$ | $n_{d11} = 1.74100$ | $v_{d11} = 52.64$ |
| $r_{12} = -46.318$ | | | |

Zoom data

| | Wide-angle | Middle | Telephoto |
|---|---|---|---|
| F n o | 4.9 | 8.9 | 13.1 |
| f | 28.84 | 52.90 | 77.60 |
| D 2 | 3.02 | 4.00 | 2.86 |
| D 8 | 9.89 | 4.19 | 2.00 |

Figure 9A:
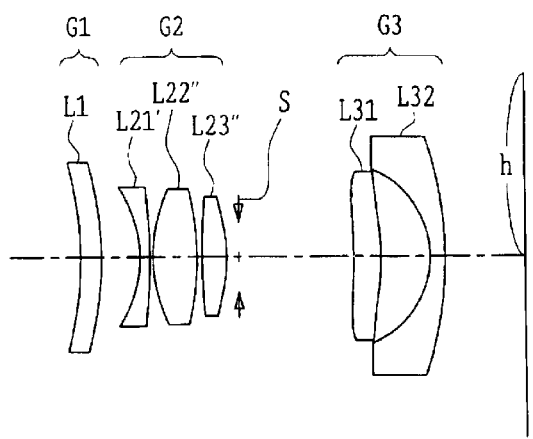
FIGS. 9A, 9B, and 9C are sectional views showing lens arrangements, developed along the optical axis, at wide-angle, middle, and telephoto positions, respectively, in a third embodiment of the three-unit zoom lens according to present invention.
Figure 9B:
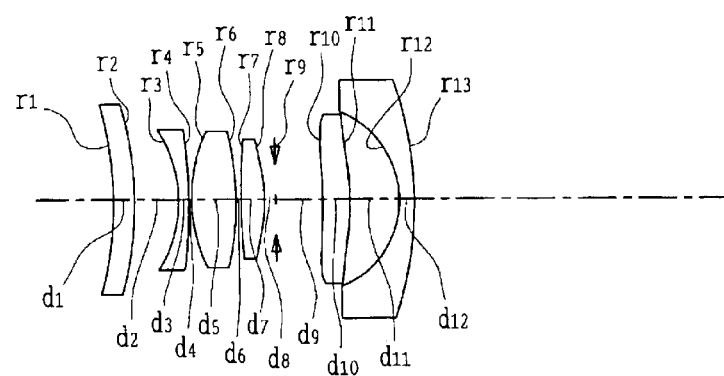
Figure 9C:
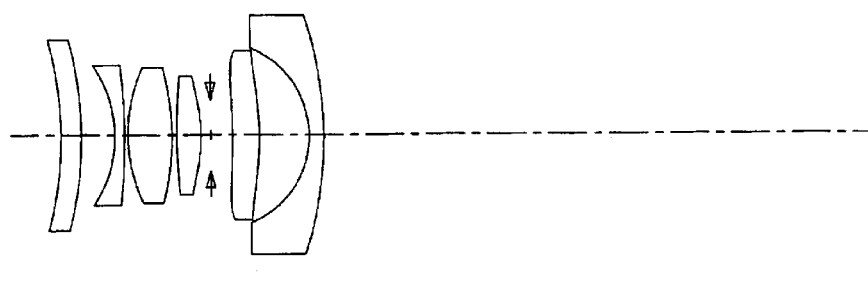

Aspherical coefficients
First surface $K = 0.0$
$A_4 = -3.8161 \times 10^{-5}$  $A_6 = 4.8846 \times 10^{-7}$  $A_8 = -1.0393 \times 10^{-9}$
$A_{10} = 0.0$ Third surface $K = 0.0$
$A_4 = -3.7729 \times 10^{-4}$  $A_6 = -6.7830 \times 10^{-6}$  $A_8 = 4.2756 \times 10^{-7}$
$A_{10} = -5.2549 \times 10^{-9}$ Fourth surface $K = 0.0$
$A_4 = -6.2735 \times 10^{-5}$  $A_6 = -8.4121 \times 10^{-7}$  $A_8 = 2.6773 \times 10^{-7}$
$A_{10} = -1.3962 \times 10^{-9}$ Ninth surface $K = 0.0$
$A_4 = 1.0434 \times 10^{-4}$  $A_6 = 2.2860 \times 10^{-6}$  $A_8 = -4.9528 \times 10^{-8}$
$A_{10} = 4.9207 \times 10^{-10}$ Tenth surface $K = 0.0$
$A_4 = -2.1368 \times 10^{-5}$  $A_6 = 2.7244 \times 10^{-6}$  $A_8 = -6.0890 \times 10^{-8}$
$A_{10} = 4.3466 \times 10^{-10}$ Third Embodiment FIGS. 9A–9C show lens arrangements in the third embodiment of the three-unit zoom lens according to present invention. FIGS. 10A–10D, 11A–11D, and 12A–12D show aberration characteristics in the third embodiment.

The three-unit zoom lens in the third embodiment includes, in order from the object side, the first lens unit G1 with positive power, the second lens unit G2 with positive power, the stop S, and the third lens unit G3 with negative power.

The first lens unit G1 with positive power is constructed with the single positive meniscus lens L1 made of plastic, directing a concave surface toward the object side and having an aspherical surface on the image side.

The second lens unit G2 with positive power is constructed with, in order from the object side, a negative meniscus lens L21' directing a concave surface toward the object side, a positive biconvex lens L22", and a positive biconvex lens L23" having an aspherical surface on the image side.

The third lens unit G3 with negative power is constructed with the plastic positive meniscus lens L31, directing a concave surface toward the object side and having aspherical surfaces on both sides and the negative meniscus lens L32 directing a concave surface toward the object side.

A zoom system that individual lens units are moved toward the object side is adopted so that when the magnification of the zoom lens is changed, extending from the wide-angle position to the telephoto position, a space between the first lens unit G1 and the second lens unit G2, after being increased as the lens units are moved from the wide-angle position toward the proximity of the middle position, is decreased as they are moved toward the telephoto position, and a space between the second lens unit G2 and the third lens unit G3 is also decreased accordingly.

The stop S is moved integrally with the second lens unit G2.

Subsequently, lens data of optical members constituting the three-unit zoom lens of the third embodiment are listed below.

Numerical data 3

| | | | |
|---|---|---|---|
| $r_1 = -38.000$ | $d_1 = 2.00$ | $n_{d1} = 1.52542$ | $v_{d1} = 55.78$ |
| $r_2 = -38.411$ (aspherical) | $d_2 = D\,2$ | | |
| $r_3 = -11.589$ | $d_3 = 1.00$ | $n_{d3} = 1.80610$ | $v_{d3} = 40.92$ |
| $r_4 = -59.753$ | $d_4 = 0.20$ | | |
| $r_5 = 14.307$ | $d_5 = 4.18$ | $n_{d5} = 1.48749$ | $v_{d5} = 70.23$ |
| $r_6 = -27.681$ | $d_6 = 0.51$ | | |
| $r_7 = 55.773$ | $d_7 = 2.17$ | $n_{d7} = 1.58313$ | $v_{d7} = 59.38$ |
| $r_8 = -17.400$ (aspherical) | $d_8 = 1.00$ | | |
| $r_9 = \infty$ (stop) | $d_9 = D\,9$ | | |
| $r_{10} = -62.811$ (aspherical) | $d_{10} = 2.53$ | $n_{d10} = 1.58423$ | $v_{d10} = 30.49$ |
| $r_{11} = -36.370$ (aspherical) | $d_{11} = 4.53$ | | |
| $r_{12} = -9.000$ | $d_{12} = 1.40$ | $n_{d12} = 1.74100$ | $v_{d12} = 52.64$ |
| $r_{13} = -38.620$ | | | |

Zoom data

| | Wide-angle | Middle | Telephoto |
|---|---|---|---|
| F n o | 4.8 | 8.9 | 13.0 |
| f | 28.84 | 52.90 | 77.60 |
| D 2 | 3.32 | 4.00 | 3.04 |
| D 9 | 10.30 | 4.29 | 2.00 |

Aspherical coefficients
Second surface $K = 0.0$
$A_4 = 1.6768 \times 10^{-5}$  $A_6 = -2.5018 \times 10^{-7}$  $A_8 = 3.6832 \times 10^{-9}$
$A_{10} = -5.1894 \times 10^{-11}$ Eighth surface $K = 0.0$
$A_4 = 1.7782 \times 10^{-4}$  $A_6 = -2.6727 \times 10^{-7}$  $A_8 = -8.0708 \times 10^{-9}$
$A_{10} = 0.0$ Tenth surface $K = 0.0$
$A_4 = 1.7744 \times 10^{-4}$  $A_6 = -4.6702 \times 10^{-6}$  $A_8 = 1.0962 \times 10^{-7}$
$A_{10} = -4.7833 \times 10^{-10}$ -continued

Numerical data 3

Eleventh surface

Figure 13A:
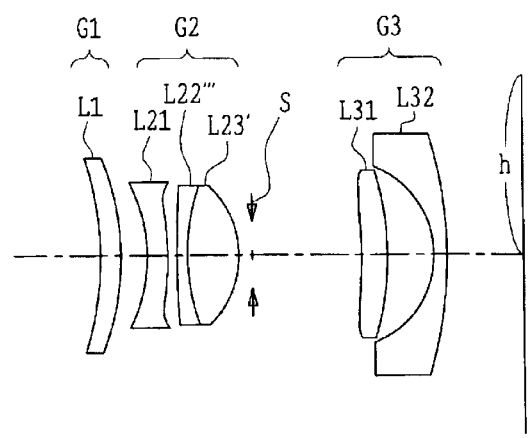
FIGS. 13A, 13B, and 13C are sectional views showing lens arrangements, developed along the optical axis, at wide-angle, middle, and telephoto positions, respectively, in a fourth embodiment of the three-unit zoom lens according to present invention.
Figure 13B:
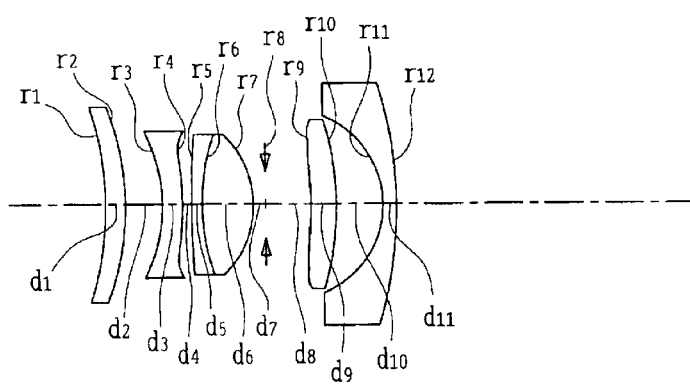
Figure 13C:
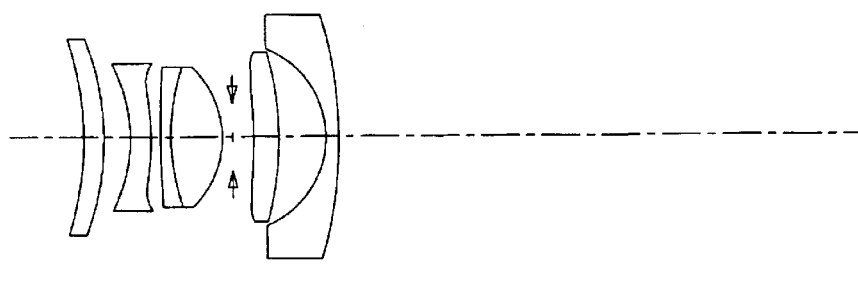

K = 0.0
$A_4 = 5.1801 \times 10^{-5}$  $A_6 = -1.3158 \times 10^{-6}$  $A_8 = -1.1327 \times 10^{-8}$
$A_{10} = 5.1146 \times 10^{-10}$ Fourth Embodiment FIGS. 13A–13C show lens arrangements in the fourth embodiment of the three-unit zoom lens according to present invention. FIGS. 14A–14D, 15A–15D, and 16A–16D show aberration characteristics in the fourth embodiment.

The three-unit zoom lens in the fourth embodiment includes, in order from the object side, the first lens unit G1 with positive power, the second lens unit G2 with positive power, the stop S, and the third lens unit G3 with negative power.

The first lens unit G1 with positive power is constructed with the single positive meniscus lens L1 made of plastic, directing a concave surface toward the object side and having an aspherical surface on the image side.

The second lens unit G2 with positive power is constructed with, in order from the object side, the negative meniscus lens L21 directing a concave surface toward the object side and having aspherical surfaces on both sides, and a cemented doublet which includes a negative meniscus lens L22'" and the positive biconvex lens L23'.

The third lens unit G3 with negative power is constructed with the plastic positive meniscus lens L31 with weak power, directing a concave surface toward the object side and having aspherical surfaces on both sides and the negative meniscus lens L32 directing a concave surface toward the object side.

A zoom system that individual lens units are moved toward the object side is adopted so that when the magnification of the zoom lens is changed, extending from the wide-angle position to the telephoto position, a space between the first lens unit G1 and the second lens unit G2, after being increased as the lens units are moved from the wide-angle position toward the proximity of the middle position, is decreased as they are moved toward the telephoto position, and a space between the second lens unit G2 and the third lens unit G3 is also decreased accordingly.

The stop S is moved integrally with the second lens unit G2.

Subsequently, lens data of optical members constituting the three-unit zoom lens of the fourth embodiment are listed below.

Numerical data 4

| | | | |
|---|---|---|---|
| $r_1 = -31.500$ | $d_1 = 2.00$ | $n_{d1} = 1.58423$ | $v_{d1} = 30.49$ |
| $r_2 = -25.285$ (aspherical) | $d_2 = D\ 2$ | | |
| $r_3 = -18.448$ (aspherical) | $d_3 = 2.00$ | $n_{d3} = 1.58423$ | $v_{d3} = 30.49$ |
| $r_4 = -24.630$ (aspherical) | $d_4 = 0.97$ | | |
| $r_5 = 170.848$ | $d_5 = 1.00$ | $n_{d5} = 1.83400$ | $v_{d5} = 37.16$ |
| $r_6 = 19.556$ | $d_6 = 5.00$ | $n_{d6} = 1.51633$ | $v_{d6} = 64.14$ |
| $r_7 = -8.957$ | $d_7 = 1.00$ | | |
| $r_8 = \infty$ (stop) | $d_8 = D\ 8$ | | |
| $r_9 = -41.714$ (aspherical) | $d_9 = 2.53$ | $n_{d9} = 1.58423$ | $v_{d9} = 30.49$ |
| $r_{10} = -28.435$ (aspherical) | $d_{10} = 4.42$ | | |
| $r_{11} = -9.000$ | $d_{11} = 1.40$ | $n_{d11} = 1.74100$ | $v_{d11} = 52.64$ |
| $r_{12} = -38.640$ | | | |

-continued

Numerical data 4

Zoom data

| | Wide-angle | Middle | Telephoto |
|---|---|---|---|
| F n o | 4.7 | 8.6 | 12.7 |
| f | 28.84 | 52.90 | 77.60 |
| D 2 | 2.43 | 3.50 | 2.61 |
| D 8 | 10.17 | 4.28 | 2.00 |

Aspherical coefficients
Second surface

K = 0.0
$A_4 = 3.8444 \times 10^{-5}$  $A_6 = -7.1995 \times 10^{-7}$  $A_8 = 5.2490 \times 10^{-9}$
$A_{10} = -1.2243 \times 10^{-11}$

Third surface

K = 0.0
$A_4 = -1.8594 \times 10^{-4}$  $A_6 = -3.7422 \times 10^{-6}$  $A_8 = 2.6980 \times 10^{-7}$
$A_{10} = -4.0279 \times 10^{-9}$

Fourth surface

K = 0.0
$A_4 = 9.4129 \times 10^{-5}$  $A_6 = 1.0181 \times 10^{-6}$  $A_8 = 2.0548 \times 10^{-7}$
$A_{10} = -7.8191 \times 10^{-10}$

Ninth surface

K = 0.0
$A_4 = 1.1551 \times 10^{-4}$  $A_6 = 2.5649 \times 10^{-6}$  $A_8 = -5.6380 \times 10^{-8}$
$A_{10} = 5.3148 \times 10^{-10}$

Tenth surface

Figure 17A:
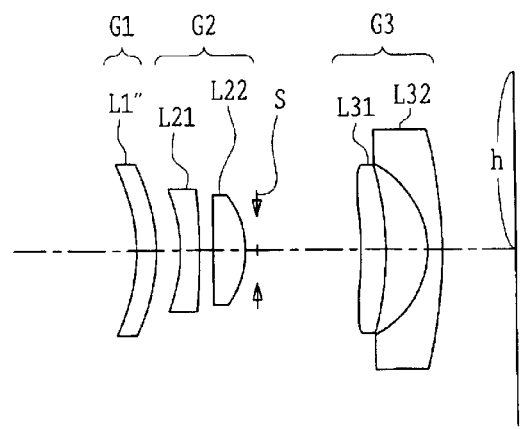
FIGS. 17A, 17B, and 17C are sectional views showing lens arrangements, developed along the optical axis, at wide-angle, middle, and telephoto positions, respectively, in a fifth embodiment of the three-unit zoom lens according to present invention.
Figure 17B:
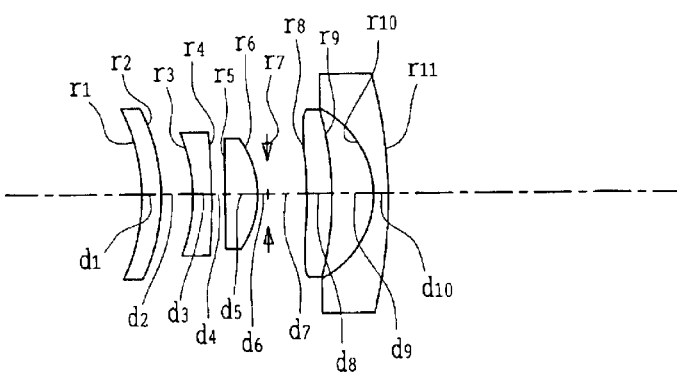
Figure 17C:
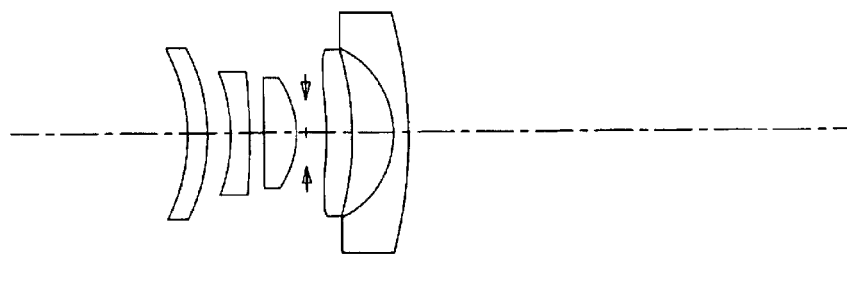

K = 0.0
$A_4 = -7.7298 \times 10^{-6}$  $A_6 = 2.6164 \times 10^{-6}$  $A_8 = -5.9295 \times 10^{-8}$
$A_{10} = 3.9279 \times 10^{-10}$ Fifth Embodiment FIGS. 17A–17C show lens arrangements in the fifth embodiment of the three-unit zoom lens according to present invention. FIGS. 18A–18D, 19A–19D, and 20A–20D show aberration characteristics in the fifth embodiment.

The three-unit zoom lens in the fifth embodiment includes, in order from the object side, the first lens unit G1 with positive power, the second lens unit G2 with positive power, the stop S, and the third lens unit G3 with negative power.

The first lens unit G1 with positive power is constructed with a single positive meniscus lens L1" made of plastic, directing a concave surface toward the object side and having aspherical surfaces on both sides.

The second lens unit G2 with positive power is constructed with, in order from the object side, the negative meniscus lens L21 directing a concave surface toward the object side and having aspherical surfaces on both sides, and the positive meniscus lens L22 directing a concave surface toward the object side.

The third lens unit G3 with negative power is constructed with the plastic positive meniscus lens L31 directing a concave surface toward the object side and having aspherical surfaces on both sides, and the negative meniscus lens L32 directing a concave surface toward the object side.

A zoom system that individual lens units are moved toward the object side is adopted so that when the magnification of the zoom lens is changed, extending from the wide-angle position to the telephoto position, a space between the first lens unit G1 and the second lens unit G2, after being increased as the lens units are moved from the wide-angle position toward the proximity of the middle position, is decreased as they are moved toward the telephoto position, and a space between the second lens unit G2 and the third lens unit G3 is also decreased accordingly.

The stop S is moved integrally with the second lens unit G2.

Subsequently, lens data of optical members constituting the three-unit zoom lens of the fifth embodiment are listed below.

Numerical data 5

| | | | |
|---|---|---|---|
| $r_1 = -30.000$ (aspherical) | $d_1 = 2.00$ | $n_{d1} = 1.52542$ | $\nu_{d1} = 55.78$ |
| $r_2 = -26.201$ (aspherical) | $d_2 = D\,2$ | | |
| $r_3 = -26.692$ (aspherical) | $d_3 = 2.00$ | $n_{d3} = 1.58423$ | $\nu_{d3} = 30.49$ |
| $r_4 = -50.505$ (aspherical) | $d_4 = 1.32$ | | |
| $r_5 = -392.797$ | $d_5 = 3.28$ | $n_{d5} = 1.48749$ | $\nu_{d5} = 70.23$ |
| $r_6 = -9.120$ | $d_6 = 1.00$ | | |
| $r_7 = \infty$ (stop) | $d_7 = D\,7$ | | |
| $r_8 = -45.826$ (aspherical) | $d_8 = 2.53$ | $n_{d8} = 1.58423$ | $\nu_{d8} = 30.49$ |
| $r_9 = -28.055$ (aspherical) | $d_9 = 4.15$ | | |
| $r_{10} = -9.180$ | $d_{10} = 1.50$ | $n_{d10} = 1.72916$ | $\nu_{d10} = 54.68$ |
| $r_{11} = -45.984$ | | | |

Zoom data

| | Wide-angle | Middle | Telephoto |
|---|---|---|---|
| F n o | 4.7 | 8.6 | 11.4 |
| f | 28.84 | 52.89 | 69.84 |
| D 2 | 2.34 | 3.00 | 2.40 |
| D 7 | 9.88 | 3.78 | 2.00 |

Figure 21A:
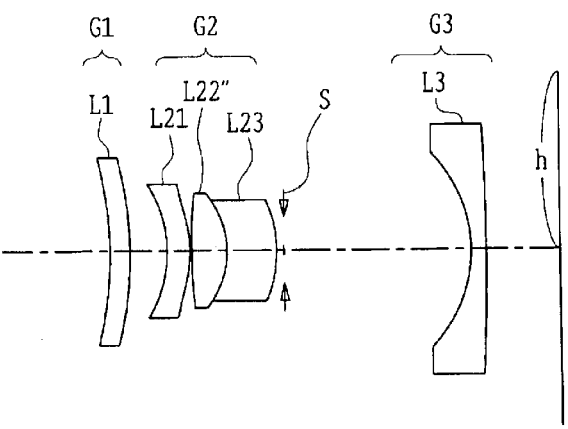
FIGS. 21A, 21B, and 21C are sectional views showing lens arrangements, developed along the optical axis, at wide-angle, middle, and telephoto positions, respectively, in a sixth embodiment of the three-unit zoom lens according to present invention.
Figure 21B:
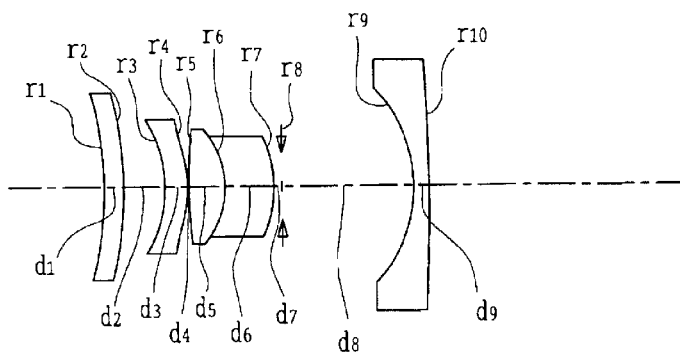
Figure 21C:
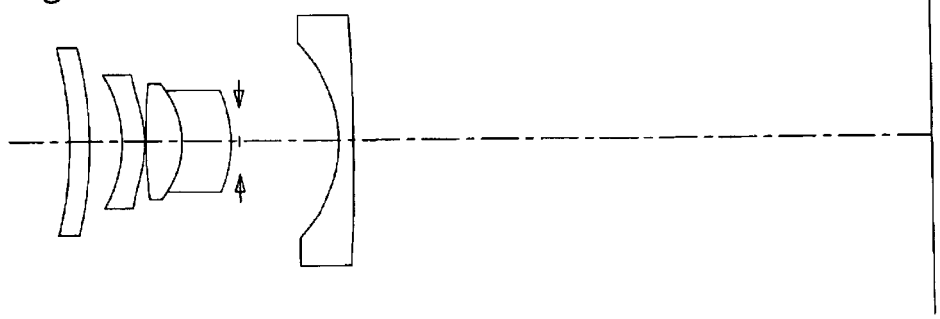

Aspherical coefficients
First surface $K = 0.0$
$A_4 = -1.9843 \times 10^{-4}$  $A_6 = 8.9530 \times 10^{-7}$  $A_8 = -1.6704 \times 10^{-9}$
$A_{10} = -1.5727 \times 10^{-11}$ Second surface $K = 0.0$
$A_4 = -1.3850 \times 10^{-4}$  $A_6 = -2.2978 \times 10^{-7}$  $A_8 = 4.8086 \times 10^{-9}$
$A_{10} = 4.6132 \times 10^{-12}$ Third surface $K = 10.690$
$A_4 = -1.8820 \times 10^{-4}$  $A_6 = -7.2487 \times 10^{-6}$  $A_8 = 9.6896 \times 10^{-8}$
$A_{10} = -3.5102 \times 10^{-10}$ Fourth surface $K = 0.0$
$A_4 = 7.0678 \times 10^{-6}$  $A_6 = -3.1958 \times 10^{-6}$  $A_8 = 9.1962 \times 10^{-8}$
$A_{10} = 1.3813 \times 10^{-9}$ Eighth surface $K = 0.0$
$A_4 = 1.2288 \times 10^{-4}$  $A_6 = 1.5069 \times 10^{-6}$  $A_8 = -4.4586 \times 10^{-8}$
$A_{10} = 4.7281 \times 10^{-10}$ Ninth surface $K = 0.0$
$A_4 = 7.4324 \times 10^{-6}$  $A_6 = 2.0529 \times 10^{-6}$  $A_8 = -5.4475 \times 10^{-8}$
$A_{10} = 3.7668 \times 10^{-10}$ Sixth Embodiment FIGS. 21A–21C show lens arrangements in the sixth embodiment of the three-unit zoom lens according to present invention. FIGS. 22A–22D, 23A–23D, and 24A–24D show aberration characteristics in the sixth embodiment.

The three-unit zoom lens in the sixth embodiment includes, in order from the object side, the first lens unit G1 with positive power, the second lens unit G2 with positive power, the stop S, and the third lens unit G3 with negative power.

The first lens unit G1 with positive power is constructed with the single positive meniscus lens L1 made of plastic, directing a concave surface toward the object side and having an aspherical surface on the image side.

The second lens unit G2 with positive power is constructed with, in order from the object side, the negative meniscus lens L21 directing a concave surface toward the object side and having aspherical surfaces on both sides, and a cemented doublet which includes the positive biconvex lens L22" and the negative meniscus lens L23 directing a concave surface toward the object side.

The third lens unit G3 with negative power is constructed with a negative meniscus lens L3 directing a concave surface toward the object side.

A zoom system that individual lens units are moved toward the object side is adopted so that when the magnification of the zoom lens is changed, extending from the wide-angle position to the telephoto position, a space between the first lens unit G1 and the second lens unit G2, after being increased as the lens units are moved from the wide-angle position toward the proximity of the middle position, is decreased as they are moved toward the telephoto position, and a space between the second lens unit G2 and the third lens unit G3 is also decreased accordingly.

The stop S is moved integrally with the second lens unit G2.

Subsequently, lens data of optical members constituting the three-unit zoom lens of the sixth embodiment are listed below.

Numerical data 6

| | | | |
|---|---|---|---|
| $r_1 = -34.000$ | $d_1 = 2.00$ | $n_{d1} = 1.52542$ | $\nu_{d1} = 55.78$ |
| $r_2 = -30.620$ (aspherical) | $d_2 = D\,2$ | | |
| $r_3 = -9.623$ (aspherical) | $d_3 = 2.15$ | $n_{d3} = 1.58423$ | $\nu_{d3} = 30.49$ |
| $r_4 = -11.862$ (aspherical) | $d_4 = 0.20$ | | |
| $r_5 = 50.000$ | $d_5 = 3.54$ | $n_{d5} = 1.51633$ | $\nu_{d5} = 64.14$ |
| $r_6 = -8.528$ | $d_6 = 4.92$ | $n_{d6} = 1.84666$ | $\nu_{d6} = 23.78$ |
| $r_7 = -11.540$ | $d_7 = 0.80$ | | |
| $r_8 = \infty$ (stop) | $d_8 = D\,8$ | | |
| $r_9 = -12.113$ (aspherical) | $d_9 = 1.50$ | $n_{d9} = 1.77250$ | $\nu_{d9} = 49.60$ |
| $r_{10} = -209.477$ | | | |

Zoom data

| | Wide-angle | Middle | Telephoto |
|---|---|---|---|
| F n o | 5.0 | 8.7 | 15.2 |
| f | 28.84 | 50.2 | 87.30 |
| D 2 | 3.50 | 4.00 | 3.20 |
| D 8 | 17.52 | 12.62 | 9.80 |

Aspherical coefficients
Second surface $K = -2.1635$
$A_4 = 8.3155 \times 10^{-5}$  $A_6 = -1.3862 \times 10^{-6}$  $A_8 = 1.6141 \times 10^{-8}$
$A_{10} = -1.1822 \times 10^{-10}$ Third surface $K = 0.2720$
$A_4 = 4.1278 \times 10^{-4}$  $A_6 = -7.6374 \times 10^{-6}$  $A_8 = 2.7053 \times 10^{-7}$
$A_{10} = -2.1736 \times 10^{-9}$ Fourth surface $K = 0.0981$
$A_4 = 3.5805 \times 10^{-4}$  $A_6 = -6.1935 \times 10^{-6}$  $A_8 = 2.6584 \times 10^{-7}$
$A_{10} = -1.8535 \times 10^{-9}$ Ninth surface $K = 0.0$
$A_4 = 5.9794 \times 10^{-5}$  $A_6 = -6.2449 \times 10^{-8}$  $A_8 = 1.9474 \times 10^{-9}$
$A_{10} = 2.4477 \times 10^{-12}$ Subsequently, the values of the conditions in individual embodiments are listed in Table 1.

TABLE 1

|         | 1st embodiment | 2nd embodiment | 3rd embodiment | 4th embodiment | 5th embodiment | 6th embodiment |
|---------|----------------|----------------|----------------|----------------|----------------|----------------|
| ft/fw   | 2.69           | 2.69           | 2.69           | 2.69           | 2.42           | 3.03           |
| ft/fl$_{G1}$ | 0.008     | 0.155          | 0.008          | 0.396          | 0.201          | 0.179          |

Figure 25:
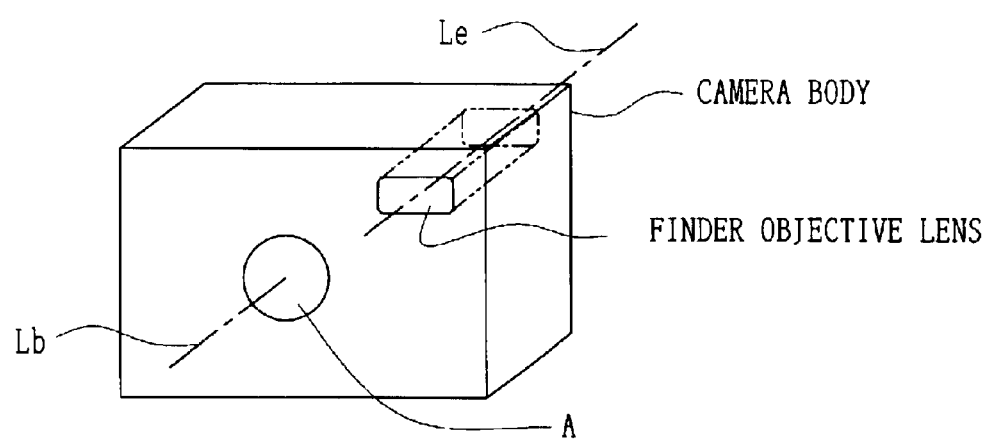
FIG. 25 is a perspective view schematically showing an example of a camera using the three-unit zoom lens of the present invention.
Figure 26:
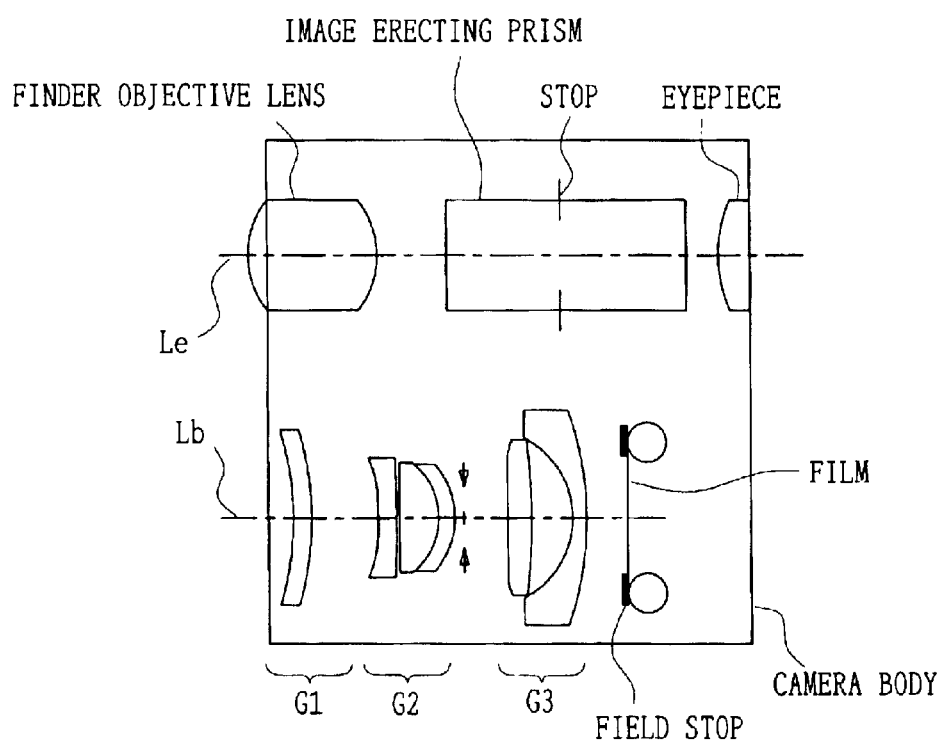
FIG. 26 is a sectional view schematically showing the interior of the camera of FIG. 25.

The three-unit zoom lens of the present invention described above is used as a photographing objective lens A for a compact camera, such as that shown in FIGS. 25 and 26. In FIG. 26, again, G1 represents the first lens unit with positive refracting power, G2 represents the second lens unit with positive refracting power, and G3 represents the third lens unit with negative refracting power. These lens units constitute the three-unit zoom lens of the present invention mentioned in the above embodiments. Reference symbol Lb denotes a photographing optical path and Le denotes a finder optical path. The photographing optical path Lb and the finder optical path Le are arranged in parallel. An image of an object is observed through a finder including a finder objective lens, an image erecting prism, a stop, and an eyepiece, and is formed on a film by the photographing objective lens A.

As the photographing objective lens of a compact electronic camera using an electronic image sensor, such as a CCD, instead of a film, the zoom optical system of the present invention can be used. In this case, a positive lens may be placed immediately before the imaging plane of the electronic image sensor so that axial and off-axis principal rays incident on the electronic image sensor become nearly perpendicular thereto.

What is claimed is:

1. A three-unit zoom lens comprising: in order from an object side,
   a first lens unit with positive refracting power;
   a second lens unit with positive refracting power; and
   a third lens unit with negative refracting power,
   said first lens unit, said second lens unit, and said third lens unit being moved toward said object side so that when a magnification of said zoom lens is changed, extending from a wide-angle position to a telephoto position, a space between said first lens unit and said second lens unit, after being increased as said first lens unit and said second lens unit are moved from said wide-angle position toward a proximity of a middle position, is decreased as said first lens unit and said second lens unit are moved toward said telephoto position, and a space between said second lens unit and said third lens unit is also decreased accordingly,
   wherein said three-unit-zoom lens has a variable magnification ratio of 2 or higher and said first lens unit consists of a single lens element.

2. A three-unit zoom lens comprising: in order from an object side,
   a first lens unit with positive refracting power;
   a second lens unit with positive refracting power; and
   a third lens unit with negative refracting power,
   spaces between individual lens units being changed when a magnification of said zoom lens is changed, extending from a wide-angle position to a telephoto position,
   wherein said first lens unit consists of a single lens element with positive refracting power, directing a concave surface toward said object side.

3. A three-unit zoom lens according to claim 1, wherein said single lens element of said first lens unit has at least one aspherical surface.

4. A three-unit zoom lens according to claim 1, wherein said single lens element of said first lens unit is made of plastic.

5. A three-unit zoom lens according to claim 1, wherein said second lens unit comprises a plurality of lens elements.

6. A three-unit zoom lens according to claim 1, wherein said third lens unit consists of, in order from said object side, a plastic lens element having at least one aspherical surface and a negative lens element.

7. A three-unit zoom lens according to claim 1, satisfying the following condition:

$$0 < ft/fl_{G1} < 0.5$$

where ft is a focal length at a long focal length position of an entire system of said three-unit zoom lens and fl$_{G1}$ is a focal length of said first lens unit.

8. A three-unit zoom lens according to claim 1, satisfying the following condition:

$$2.3 < ft/fw < 3.2$$

where ft is a focal length at a long focal length position of an entire system of said three-unit zoom lens and fw is a focal length of a short focal length position of an entire system of said three-unit zoom lens.

9. A three-unit zoom lens according to claim 1, wherein said single lens element of said first lens unit is a meniscus lens element.

10. A three-unit zoom lens according to claim 1, wherein said second lens unit consists of, in order from said object side, a meniscus lens element directing a concave surface toward said object side and a positive lens component.

11. A three-unit zoom lens according to claim 1, wherein said second lens unit comprises, in order from said object side, a meniscus lens element directing a concave surface toward said object side and a plurality of positive lens components.

12. A three-unit zoom lens according to claim 1, further comprising an aperture stop interposed between said second lens unit and said third lens unit.

13. A three-unit zoom lens according to claim 12, wherein when said magnification is changed, said aperture stop is moved integrally with said second lens unit.

14. A camera including:
   a three-unit zoom lens comprising: in order from an object side,
   a first lens unit with positive refracting power;
   a second lens unit with positive refracting power; and
   a third lens unit with negative refracting power,
   said first lens unit, said second lens unit, and said third lens unit being moved toward said object side so that when a magnification of said zoom lens is changed, extending from a wide-angle position to a telephoto position, a space between said first lens unit and said second lens unit, after being increased as said first lens unit and said second lens unit are moved from said wide-angle position toward a proximity of a middle position, is decreased as said first lens unit and said second lens unit are moved toward said telephoto position, and a space between said second lens unit and said third lens unit is also decreased accordingly, wherein said three-unit zoom lens has a variable magnification ratio of 2 or higher and said first lens unit consists of a single lens element;

a field stop located on an image side of said zoom lens; and a finder provided to be independent of said zoom lens.

15. A camera including:

a three-unit zoom lens comprising: in order from an object side,
- a first lens unit with positive refracting power;
- a second lens unit with positive refracting power; and
- a third lens unit with negative refracting power, spaces between individual lens units being changed when a magnification of said zoom lens is changed, extending from a wide-angle position to a telephoto position, wherein said first lens unit consists of a single lens element with positive refracting power, directing a concave surface toward said object side;

a field stop located on an image side of said zoom lens; and a finder provided to be independent of said zoom lens.

* * * * *